(12) United States Patent
Teng et al.

(10) Patent No.: US 11,790,898 B1
(45) Date of Patent: Oct. 17, 2023

(54) RESOURCE SELECTION FOR PROCESSING USER INPUTS

(71) Applicant: Amazon Technologies, Inc., Seattle, WA (US)

(72) Inventors: Da Teng, Sammamish, WA (US); Muhammad Bilal Khokhar, Carnation, WA (US); Naresh Narayanan, Seattle, WA (US); Bharath Bhimanaik Kumar, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 17/361,703

(22) Filed: Jun. 29, 2021

(51) Int. Cl.
*G10L 15/19* (2013.01)
*G10L 15/30* (2013.01)
*G10L 15/22* (2006.01)

(52) U.S. Cl.
CPC .............. *G10L 15/19* (2013.01); *G10L 15/22* (2013.01); *G10L 15/30* (2013.01)

(58) Field of Classification Search
USPC .................................................... 704/1–504
See application file for complete search history.

(56) References Cited

U.S. PATENT DOCUMENTS

| | | | | |
|---|---|---|---|---|
| 6,076,088 A * | 6/2000 | Paik | ....................... | G06F 16/367 707/999.005 |
| 9,865,254 B1 * | 1/2018 | Filimonov | .............. | G10L 15/02 |
| 10,049,668 B2 * | 8/2018 | Huang | ................... | G10L 15/285 |
| 10,599,767 B1 * | 3/2020 | Mattera | .................. | G06F 40/242 |
| 10,607,141 B2 * | 3/2020 | Jerram | ...................... | G10L 15/08 |
| 10,747,651 B1 * | 8/2020 | Vanderwall | ......... | G06F 11/3684 |
| 10,943,583 B1 * | 3/2021 | Gandhe | ................. | G10L 15/183 |
| 10,977,155 B1 * | 4/2021 | Muras | ................. | G06F 11/3608 |
| 11,010,284 B1 * | 5/2021 | Santiago | ................ | G06N 20/00 |
| 11,113,175 B1 * | 9/2021 | Adamo | ................ | G06F 40/216 |
| 11,238,227 B2 * | 2/2022 | Velikovich | ............ | G10L 15/187 |
| 2004/0030741 A1 * | 2/2004 | Wolton | ................. | G06F 16/954 709/202 |
| 2021/0090694 A1 * | 3/2021 | Colley | ................... | G16B 40/00 |
| 2022/0093101 A1 * | 3/2022 | Krishnan | ............... | G10L 15/20 |
| 2023/0023083 A1 * | 1/2023 | Shelton, IV | ........... | H04L 67/10 |

* cited by examiner

*Primary Examiner* — Marcus T Riley
(74) *Attorney, Agent, or Firm* — PIERCE ATWOOD LLP

(57) ABSTRACT

Techniques for prioritizing resources of various users, associated with a device, when responding to a user input received from the device are described. When a user input is received from a device, a system may generate a resource list for a group profile (e.g., a household profile) and each user profile (including any guest user profile) associated with the device. Each resource list may include the catalogs of resources (e.g., songs of a playlist, contacts of a contact list, etc.) of the group profile or user profile. The system may also generate a weight matrix including a respective weight for each catalog of each resource list. Various processing components (e.g., an automatic speech recognition component, a natural language understanding component, and an entity resolution component) may process using the resource lists and the weight matrix to determine an output responsive to the user input.

20 Claims, 12 Drawing Sheets

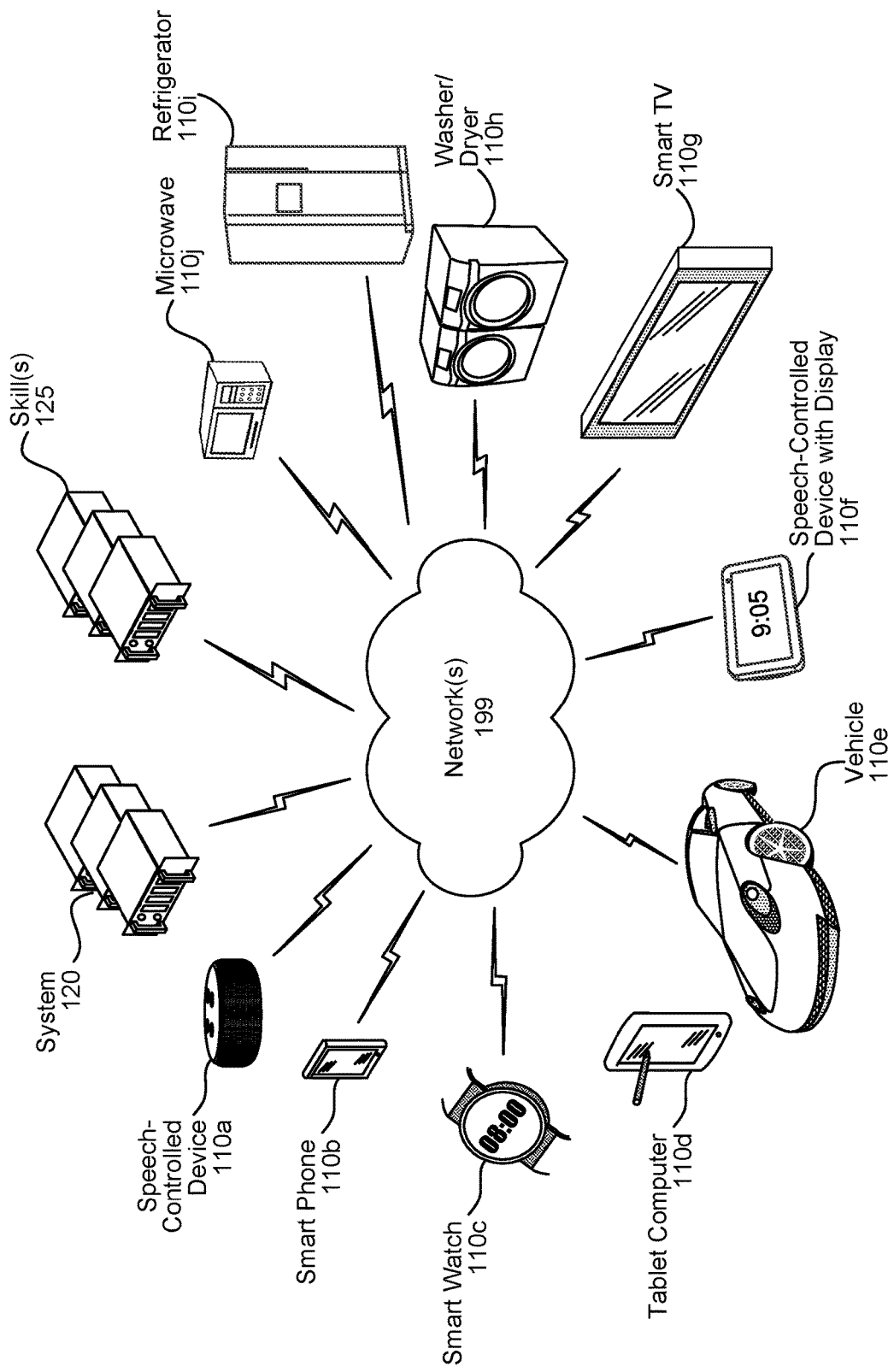

US 11,790,898 B1

RESOURCE SELECTION FOR PROCESSING USER INPUTS

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 12 illustrates an example of a computer network for use with the overall system, according to embodiments of the present disclosure.

DETAILED DESCRIPTION

Figure 1:
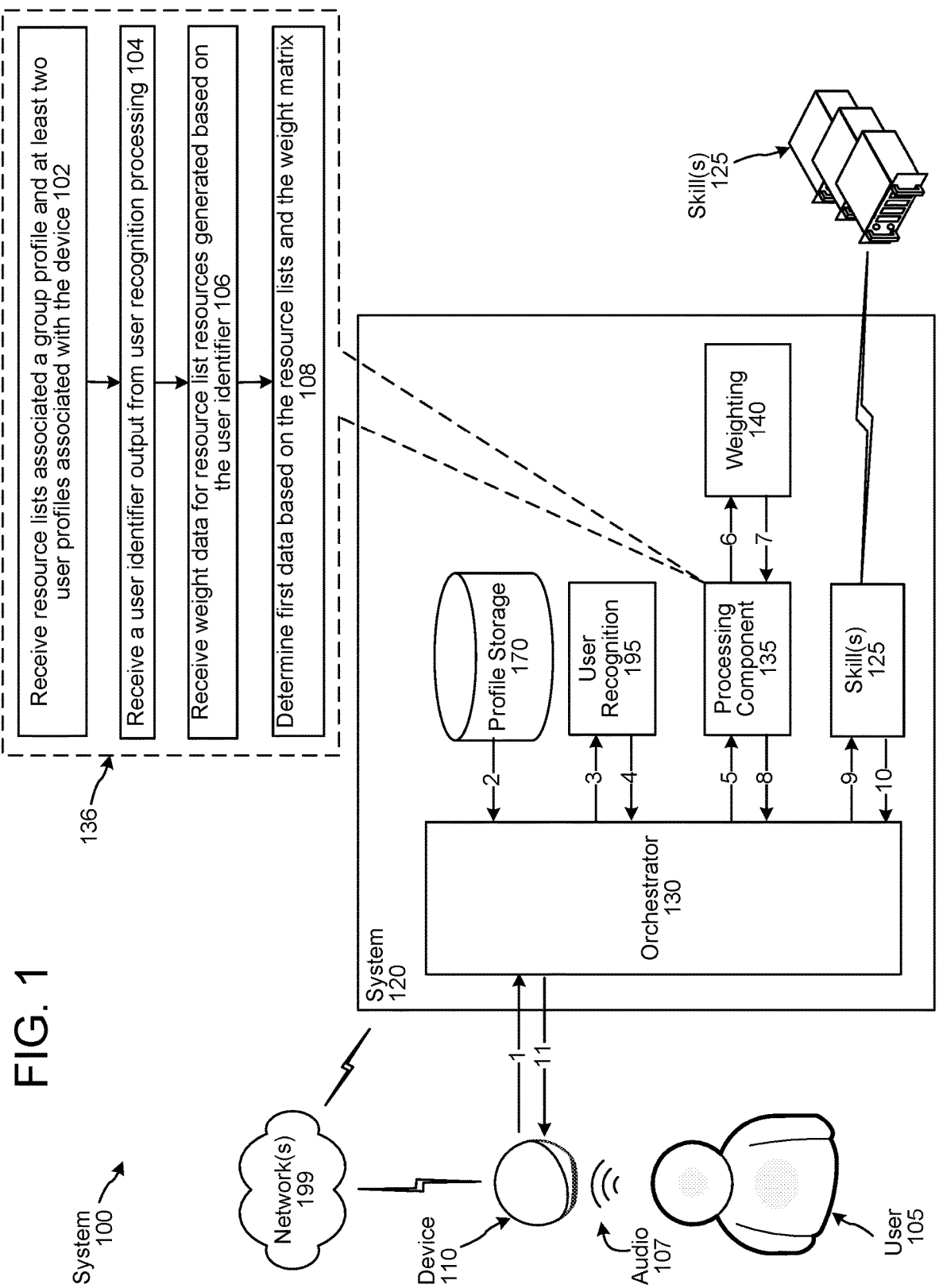
FIG. 1 is a conceptual diagram illustrating a system configured to select resources for processing a user input, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may store an account associated with one or more users and one or more devices capable of receiving spoken inputs (and other types of user inputs). In addition, the account may be associated with one or more resources that can be used to respond to a user input received by the one or more devices. For example, a user may associate a music subscription with the account, thereby permitting songs (corresponding to the music subscription) to be output in response to user inputs received from the one or more devices of the account. For further example, a user may associate a contact list with the account, thereby permitting calls and messaging to be performed using contacts in the contact list. In the foregoing examples, the one or more resources of the account correspond to the songs of the music subscription and the contacts of the contact list.

In some instances, the system may limit an account to being associated with a single user's resources even though another user may also have resources corresponding to the same resource type. For example, an account may be associated with a first user and a second user, and each of the first user and the second user may have a respective music subscription to the same music provider, but the system may only permit one of the users' music subscriptions to be associated with the account. For further example, an account may be associated with a first user profile and a second user profile, and each of the first user profile and the second user profile may have a respective contact list, but the system may only permit one of the contact lists to be associated with the account. The foregoing examples result in a user experience in which only the associated music subscription or contact list may be used as a resource for responding to a user input received by a device of the account, regardless of which user provided the user input.

The present disclosure provides, among other things, a system and method for prioritizing resources to respond to a user input using resources requested by the user. In some embodiments, the system may be configured to store a group profile encompassing one or more individual user profiles and one or more device profiles. Each user profile may be associated with respective resources corresponding to a same resource type (e.g., respective music subscriptions associated with the same music provider, respective contact list, etc.). Moreover, a user may indicate that the user's resources should be shared among users of the group profiles devices, resulting in the user's resources (e.g., the user's music subscription, contact list, etc.) being associated with the user's profile and the group profile.

When the system receives a user input from a device of the group profile, the system loads all resources of the group profile and each user profile associated therewith, and prioritizes which resources to use to respond to the user input. For example, the system may recognize the user that provided the user input, and may determine whether the user's resources should be used to respond to the user input, or whether shared resources of the group profile should be used to respond to the user input. In some embodiments, the system may implement a machine learning (ML) model and/or one or more rules indicating how resources are to be prioritized based on a domain and/or intent of the user input.

As used herein, a "domain" refers to a collection of related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

A group of skills, configured to provide related functionality, may be associated with a domain. For example, one or more music skills may be associated with a music domain. As used herein, a "skill" may refer to software, that may be placed on a machine or a virtual machine (e.g., software that may be launched in a virtual instance when called), configured to process at least a NLU hypothesis (including an intent and optionally one or more entities), and perform one or more actions in response thereto. For example, in response to the user input "play music by [artist]," a music skill may output music sung by the indicated artist; in response to the user input "turn on the lights," a smart home skill may turn on "smart" lights associated with a user or group profile; in response to the user input "what is the weather," a weather skill may output weather information for a geographic location corresponding to the device that captured the user input; etc. In the foregoing examples, actions correspond to the outputting of music, the turning on of "smart" lights, and the outputting of weather information. A skill may operate in conjunction between various components of the system, such as user devices, restaurant electronic ordering systems, taxi electronic booking systems, etc. in order to complete certain functions. What is referred to herein as a skill may sometimes be referred to as an application, bot, or the like.

In some embodiments, when a processing component (e.g., ASR component, NLU component, etc.) of the system is called to process, the processing component may receive resources associated with at least two user profiles associated with the device that received the user input. The processing component may in turn make an application programming interface (API) call to obtain a weight matrix for the received resources, where the weight matrix includes a weight for each set of resources received by the processing component. The processing component may apply the weight matrix to the received resources to determine which resources are to be used by the processing component to process with respect to the user input. For example, the ASR component may use the weight matrix to determine which resources are to be used to generate an ASR hypothesis representing the (spoken) user input, the NLU component may use the weight matrix to determine which resources are to be used to generate a NLU hypothesis corresponding to the user input, etc.

The teachings of the present disclosure, among other things, provide an improved user experience by enabling a system to provide a personalized output to a user by processing a user input using applicable resources of the user, applicable resources of another user of a group of users, or resources stored at the group level.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to select resources for processing a user input. Although the figures and discussion of the present disclosure illustrate certain steps in a particular order, the steps described may be performed in a different order (as well as certain steps removed or added) without departing from the present disclosure.

As shown in FIG. 1, the system 100 may include a device 110 (local to a user 105) in communication with a system 120 across a network(s) 199. The network 199 may include the Internet and/or any other wide- or local-area network, and may include wired, wireless, and/or cellular network hardware.

In some examples, the user 105 may speak an input, and the device 110 may capture audio 107 representing the spoken input. In other examples, the user 105 may provide another type of input (e.g., typed natural language input, selection of a button, selection of one or more displayed graphical interface elements, performance of a gesture, etc.). The device 110 may send (step 1) audio data (or other type of input data, such as, image data, text data, etc.) corresponding to the user input to the system 120 for processing. In some embodiments, an orchestrator component 130, of the system 120, may receive the input data from the device 110. The orchestrator component 130 may be configured to coordinate data transmissions between components of the system 120.

Upon receiving the input data, the orchestrator component 130 may query (step 2) a profile storage 170, of the system 120, for resources relevant to processing of the user input. As used herein, a "resource" is data that may be used by a processing component of the system 120 to perform some processing with respect to a user input. Example resources include, but are not limited to songs of a playlist, contacts of a contact list, smart home device information, movies of a movie collection, etc.

The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user profile identifier. Each user profile may include various user identifying data (e.g., name, gender, address, language(s), etc.). Each user profile may also include preferences of the user. Each user profile may include one or more device identifiers (e.g., device serial numbers), each representing a respective device registered to the user. Each user profile may include skill identifiers of skills 125 that the user has enabled. When a user enables a skill 125, the user is providing the system 120 with permission to allow the skill 125 to execute with respect to the user's user inputs. If a user does not enable a skill 125, the system 120 may not execute the skill 125 with respect to the user's user inputs. Each user profile may include resources of the user corresponding to the user profile.

The profile storage 170 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. For further example, a group profile may be a campus profile associated with multiple users of the campus. In another example, a group profile may be a building profile associated with multiple users of the building. For further example, a group profile may be a vacation home profile associated with multiple users of the vacation home. In another example, a group profile may be a vehicle profile associated with multiple users of the vehicle. Various other types of group profiles are within the scope of the present disclosure. The present disclosure envisions any type of group profile corresponding to an environment and a two or more users. A group profile may include resources that are to be shared by all the user profiles associated therewith (e.g., can be used to process user inputs received from a device associated with the group profile, regardless of the identity of the user). A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

In some embodiments, a group profile may be temporarily associated with a user's profile. Such a user profile may be referred to as a "guest" user profile. For example, when a first user visits a home of another/second user, a hotel, or some other environment that is typically associated with a second user, the first user may provide a user input asking for the first user's user profile to be associated with the environment. In response to the system 120 receiving such a user input, the system 120 may determine a user profile of the first user, determine a group profile associated with the device 110 from which the user input was received, and associate the user profile with the group profile. In some embodiments, the system 120 may configure the foregoing association to be deleted after a period of time (e.g., an hour, a day, etc.).

The profile storage 170 may associate a resource with a particular user profile. Such a resource may only be used to process user inputs originating from the user corresponding to the user profile. Examples of such user-level resources include calendar events of a digital calendar, songs of a playlist, and electronic notes.

The profile storage 170 may alternatively associate a resource with a particular user profile and an associated group profile. For example, when a user registers a new smart home device with the system 120, creates a new song playlist, etc., the user may indicate that the resource (e.g., the new smart home device, the songs of the playlist, etc.) are to be shared (i.e., that the resource can be used to process user inputs that are not known to have originated from the user creating the resource). As a result, the system 120 may associate, in the profile storage 170, the resource with the profile of the user creating the resource, and the group profile (e.g., household profile) associated with the user's profile.

When the system 120 receives the input data at step 1, the input data may be associated with a device identifier corresponding to the device 110 that received the user input. The orchestrator component 130 may query (at step 2) the profile storage 170 for, and receive therefrom, resources associated with a group profile identifier associated with the device identifier, and each user profile identifier (including a guest user profile identifier is applicable) associated with the group profile identifier.

Figure 2:
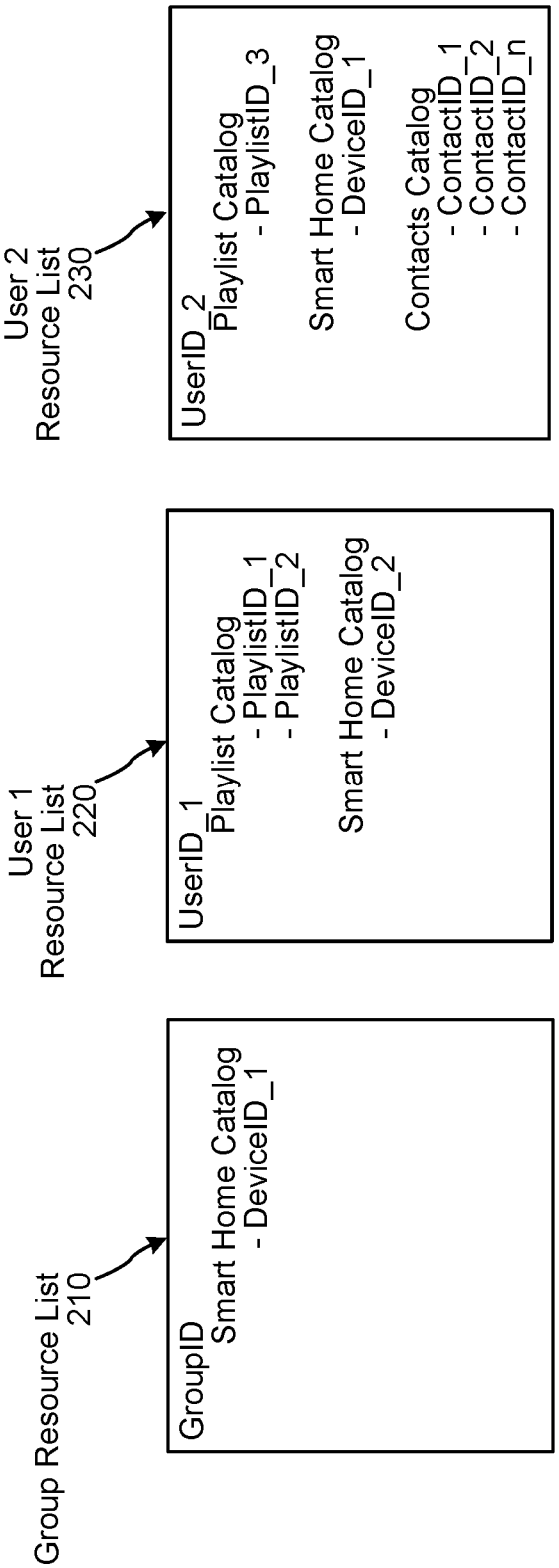
FIG. 2 is a conceptual diagram illustrating example resource lists that may be received from querying a profile storage, according to embodiments of the present disclosure.

The foregoing query of the profile storage 170 may return one or more resource lists, where each resource list represents one or more resources of a profile. A resource list may include a catalog or resources. As used herein, a "catalog" refers to a collection of resources corresponding to a same resource type (e.g., contacts, playlist, smart home devices, etc.) within a user profile or group profile. FIG. 2 illustrates example resources lists that the orchestrator component 130 may receive in response to querying the profile storage 170.

As illustrated in FIG. 2, the orchestrator component 130 may receive a group resource list 210 representing resources associated with a "GroupID," a user 1 resource list 220 representing resources associated with a "UserID 1," and a user 2 resource list 230 representing resources associated with a "UserID 3." However, it will be appreciated that a group profile identifier may be associated with more than two user profile identifiers and, in such situations, the orchestrator component 130 may receive a respective resource list for each of the more than two user profile identifiers.

As illustrated, the group resource list 210 includes a smart home catalog including a smart home device resource corresponding to "DeviceID 1;" the user 1 resource list 220 includes a playlist catalog, including playlist resources corresponding to "PlaylistID 1" and "PlaylistID 2," and a smart home catalog including a smart home device resource corresponding to "DeviceID 2;" and the user 2 resource list 230 includes a playlist catalog, including a playlist resource corresponding to "PlaylistID 3," a smart home catalog, including a smart home device resource corresponding to "DeviceID 1," and a contacts catalog including contact resources corresponding to "ContacID 1" through "ContactID n." Based on FIG. 2, it will be appreciated that each resource list may include the catalog(s) and corresponding resource(s) specifically associated with the profile identifier (e.g., group profile identifier or user profile identifier). The group resource list 210 and the user 2 resource list 230 both including smart home catalogs with the resource "DeviceID 1" illustrates the situation where user 2 registered the smart home device corresponding to "DeviceID 1" and indicated that the smart home device could be shared as a resource for processing user inputs received from a device 110 associated with the group profile (i.e., the "GroupID" of the group resource list 210), regardless of the user that provides the user input. As each user's resources may be different, and all, some, or none of a user's resources may be shared, the group and user resource lists received by the orchestrator component 130 may represent different resources.

The orchestrator component 130 may also call (step 3) a user recognition component 195, of the system 120, to perform user recognition processing to determine a user that provided the user input received at step 1. The orchestrator component 130 may call the user recognition component 195 in series, or at least partially in parallel, to querying the profile storage 170 for the resource lists.

The user recognition component 195 may recognize the user 105, as providing the user input received at step 1, using various data. The user recognition component 195 may take as input audio data representing the user input, when the user input is a spoken user input. The user recognition component 195 may perform user recognition by comparing speech characteristics, in the audio data, to stored speech characteristics of users associated with the device 110 (e.g., users having user profiles associated with and/or indicating the device 110). The user recognition component 195 may additionally or alternatively perform user recognition by comparing biometric data (e.g., fingerprint data, iris data, retina data, etc.), received by the system 120 in correlation with the user input, to stored biometric data of users associated with the device 110. The user recognition component 195 may additionally or alternatively perform user recognition by comparing image data (e.g., including a representation of at least a feature of the user 105), received by the system 120 in correlation with the user input, with stored image data including representations of features of different users associated with the device 110. The user recognition component 195 may perform other or additional user recognition processes, including those known in the art.

The user recognition component 195 determines whether the user input originated from a particular user. For example, the user recognition component 195 may determine a first value representing a likelihood that the user input originated from a first user associated with the device 110, a second value representing a likelihood that the user input originated from a second user associated with the device 110, etc. The user recognition component 195 may also determine an overall confidence regarding the accuracy of user recognition processing. The user recognition component 195 may send (step 4), to the orchestrator component, a single user identifier corresponding to the most likely user that originated the user input, or multiple user identifiers (e.g., in the form of an N-best list) with respective values representing likelihoods of respective users originating the user input.

The orchestrator component 130 may call (step 5) a processing component 135, of the system 120, to process. The processing component 135 may be any component of the system 120 configured to perform at least some processing with respect to the user input received at step 1. As examples, the processing component 135 may be an ASR component 850 of the system 120, a NLU component 860 of the system 120, or an entity resolution component 865 of the system 120.

In some embodiments, the processing component 135 may perform a process 136 as illustrated in FIG. 1. The processing component 135 may receive (step 102), from the orchestrator component 130, the resource lists received in response to querying the profile storage 170. For example, the processing component 135 may receive resource lists associated with a group profile and at least two user profiles associated with the group profile. The processing component 135 may also receive (step 104), from the orchestrator component 130, the user identifier (or top-scoring user identifier) output by the user recognition component 195.

In some embodiments, the orchestrator component 130 may not query the profile storage for resources relevant to process of the user input at step 2, and may not send resource lists (represents the resources) to the processing component 135. In such embodiments, the orchestrator component 130 may send the user identifier (output by the user recognition component 195) and/or the device identifier (of the device 110) to the processing component 135. In response, the processing component 135 may query the profile storage 170 for resource lists representing resources of the group profile and all user profiles associated therewith.

The processing component 135 may also receive (step 106) weight data (e.g., a weight matrix) for the resources represented in the received resource lists. The processing component 135 may send (step 6), to a weighting component 140 of the system 120, a request for a weighting matrix for the resources represented in the received resource lists. The request may include the group profile identifier and user profile identifiers of the resource lists received by the processing component 135, the user identifier output by the user recognition component 195, a device identifier of the device 110, and/or other context data usable by the weighting component 140 to generate a weighting matrix. In some embodiments, the processing component 135 may make the request via an application programming interface (API) of the weighting component 140.

The weighting component 140 may implement an algorithm for generating a weight matrix for the resources represented in the resource lists received by the processing component 135. In some instances, the processing component 135 may identify a domain corresponding to the user input, and send an indication of the domain to the weighting component 140 as part of the request step at step 6. In some embodiments, for a given domain, the algorithm may be configured to prioritize (i.e., more heavily weight) resources of the user (that provided the user input) over resources of the other user(s) and the group of users. In other embodiments, for a given domain, the algorithm may be configured to prioritize (i.e., more heavily weight) resources of the user that registered the device 110 (e.g., the account owner) over resources of the other user(s) and group of users.

In some instances, a user profile may include a user preference for weighting resources. The weighting component 140 may query (e.g., via the orchestrator component 130) the profile storage 170 for such user preferences associated with user profile identifiers input thereto (i.e., user profile identifiers represented in the resource lists received by the processing component 135). For example, a user weighting preference may indicate that any time a user is determined to have provided a user input (as determined by the user recognition component 195), and the user input corresponds to a particular intent, resources of the group are to be weighted more heavily than resources of the user. For further example, a user weighting preference may indicate that any time a user is determined to have provided a user input (as determined by the user recognition component 195), and the user input corresponds to a particular intent, resources of the user are to be weighted more heavily than resources of the other user(s) and group resources.

In some embodiments, the system 120 may derive a user preference from a frequency of past user inputs and which resources were used to response to the user inputs. For example, the system 120 may determine a user preference for resource used to respond to frequently received past user inputs.

The weighting component 140 may generate a weight matrix that represents the weight of each catalog in each resource list received by the processing component 135. An example of such a weight matrix is:

$$\begin{bmatrix} \text{Weight}_{11} & \cdots & \text{Weight}_{1n} \\ \vdots & \ddots & \vdots \\ \text{Weight}_{m1} & \cdots & \text{Weight}_{mn} \end{bmatrix},$$

where m represents a catalog and n represents a resource list.

In some embodiments, prior to the orchestrator component 130 receiving the resource lists from the profile storage 170, the orchestrator component 130 may determine the group profile identifier and user profile identifiers associated with the device identifier of the device 110, and send the group profile identifier and user profile identifiers to the processing component 135. In response to receiving the foregoing identifiers, the processing component 135 may request the weight matrix from the weighting component 140. In these embodiments, while or after the weighting component 140 determines the weighting matrix, the orchestrator component 130 may receive the resource lists and send same to the processing component 135.

The weighting component 140 may query the profile storage 170 for catalogs associated with the group profile identifier and user profile identifiers received from the processing component 135. The weighting component 140 may thereafter, using an algorithm and taking into consideration all relevant context data for the user input, domain preferences, and user preferences, generate the weight matrix including a weight for each received catalog. An example weight matrix is as follows:

$$\left\{ \begin{array}{l} \text{GroupID}: (\text{Catalog1}: w11, \text{Catalog2}: w12, \ldots, \text{Catalog}N: w1n) \\ \text{UserID\_1}: (\text{Catalog1}: w21, \text{Catalog2}: w22, \ldots, \text{Catalog}N: w2n) \\ \text{UserID\_2}: (\text{Catalog1}: w31, \text{Catalog2}: w32, \ldots, \text{Catalog}N: w3n) \\ \ldots \\ \text{UserID\_N}: (\text{Catalog1}: wN1, \text{Catalog2}: wN2, \ldots, \text{Catalog}N: wNn) \end{array} \right\}.$$

More than one processing component 135 of the system 120 may request a weight matrix, from the weighting component 140, for the current user input (received in step 1). In some embodiments, the weighting component 140 may generate a new weight matrix in response to each request. However, since the weight matrix is being generated with respect to the same user input, each instance of the weight matrix may be the same or substantially similar such that each processing components prioritizes resources of the same resource list.

Once the weighting component 140 generates the weight matrix, the weighting component 140 may output (step 7) the weight matrix, and the processing component 135 may receive (step 106) the weight matrix. After receiving the weighting matrix, the processing component 135 may determine (step 108) first data based on the resource lists (received from the orchestrator component 130) and the weight matrix.

To determine the first data, the processing component 135 may apply the weight matrix to the resource lists received from the orchestrator component 130. Such application of the weight matrix to a resource list i may be represented as:

$$\text{Artifact}_i = \sum_{j=0}^{n} \left( \text{Weight}_{ij} \otimes \text{Catalog}_{ij} \right)$$

An example matrix, resulting from application of the weight matrix to all resource lists, received by the processing component 135, may be represented as:

$$\left\{ \begin{array}{l} \text{GroupID}: \text{Resource List}(\text{Catalog1}: w11, \text{Catalog2}: w12, \ldots, \text{Catalog}N: w1n) \\ \text{UserID\_1}: \text{Resource List}(\text{Catalog1}: w21, \text{Catalog2}: w22, \ldots, \text{Catalog}N: w2n) \\ \text{UserID\_2}: \text{Resource List}(\text{Catalog1}: w31, \text{Catalog2}: w32, \ldots, \text{Catalog}N: w3n) \\ \ldots \\ \text{UserID\_N}: \text{Resource List}(\text{Catalog1}: wN1, \text{Catalog2}: wN2, \ldots, \text{Catalog}N: wNn) \end{array} \right\}.$$

After generating the above matrix, the processing component 135 may generate first data using the highest weighted catalog. If the processing component 135 is the ASR component 850, the first data may be ASR output data (e.g., an ASR hypothesis) representing the spoken input. If the processing component 135 is the NLU component 860, the first data may be NLU output data (e.g., a NLU hypothesis) representing the user input. If the processing component 135 is the ER component 865, the first data may be one or more entity identifiers. The processing component 135 may send (step 8) the first data to the orchestrator component 130.

The orchestrator component 130 may cause various processing components of the system 120 to process, as described herein above to generate "first data," until the orchestrator component 130 receives "first data" representing a skill 125 to process in response to the current user input. In response thereto, the orchestrator component 130 may call (step 9) the skill 125 to execute to perform an action responsive to the user input. The skill 125 may process to determine output data responsive to the user input (e.g., based on an intent and the entity(ies) of the user input, as determined by the NLU component 860 and the ER component 865. For example, if the user input requests the playing of a song, the output data may be an audio file (or link to an audio file) corresponding to the song. For further example, if the user input requests weather information, the output data may be structured or natural language data corresponding to the requested weather information.

The skill 125 sends (step 10) the output data to the orchestrator component 130, and the orchestrator component 130 causes (step 11) an output, corresponding to the output data, to be presented to the user 105 via the device 110. Causing the output to be presented may include the orchestrator component 130 calling a TTS component 880 (discussed with respect to FIG. 8) to process the output data to generate output audio data including synthesized speech.

Figure 3:
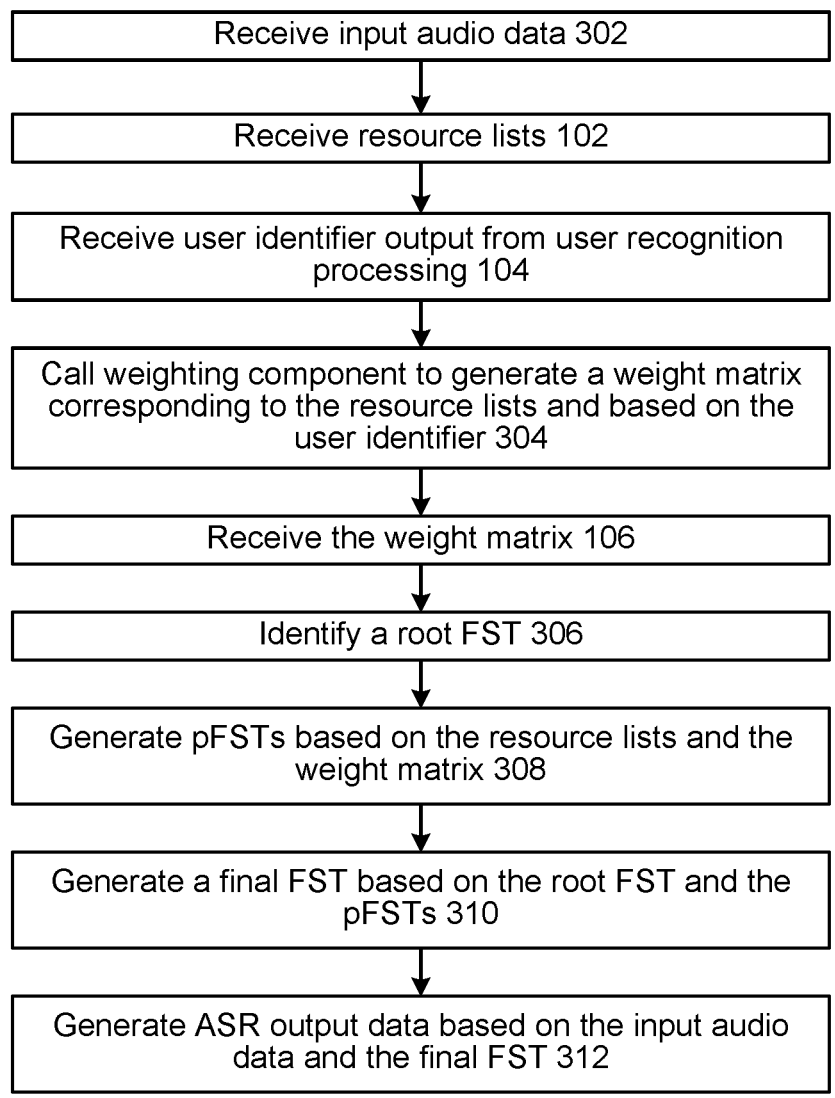
FIG. 3 is a process flow diagram illustrating processing that may be performed by an automatic speech recognition (ASR) component, according to embodiments of the present disclosure.

FIG. 3 illustrates example processing that may be performed by an ASR component 850 (an example processing component 135) of the system 120. As illustrated, the ASR component 850 may receive (step 302) input audio data corresponding to the (spoken) user input. The ASR component 850 may also receive (step 102) the resource lists (from the orchestrator component 130 or directly from the user profile storage 170), and receive (step 104) the user identifier output from user recognition processing, as described herein with respect to FIG. 1.

After receiving the resource lists and the user identifier, the ASR component 850 may call (step 304) the weighting component 140 to generate a weight matrix corresponding to the resource lists and based on the user identifier. As described with respect to FIG. 1, such a call may include the ASR component 850 sending, to the weighting component 140, the group profile identifier and user profile identifiers of the resource lists received by the ASR component 850, and the user identifier output by the user recognition component 195, and potential other context data such as, but not limited to, a device identifier of the device 110.

The weighting component 140 may then process to generate the weight matrix. The weighting component 140 may query the profile storage 170 for catalogs of resources associated with the group profile identifier and each user profile identifier received from the ASR component 850. In the situation where the user recognition component 195 is able to recognize the user 105, and the ASR component 850 sends a user identifier (of the user 105) to the weighting component 140 at step 304, the weighting component 140 may generate the weight matrix to prioritize the catalog(s) of resources associated with the user identifier in the profile storage 170. In other words, the weighting component 140 may generate the weight matrix such that the catalog(s) of resources, associated with the user identifier, correspond to a greater weight(s) than catalogs of resources, associated with the group profile identifier and other user identifier(s), in the weight matrix.

In some situations, the user recognition component 195 may be unable to recognize the user 105. In such situations, the ASR component 850 may not receive the user identifier at step 304, and may not send a user recognition-determined user identifier to the weighting component 140 at step 304. In such situations, the weighting component 140 may generate the weight matrix to prioritize the catalog(s) of resources associated with the group profile identifier in the profile storage 170. In other words, the weighting component 140 may generate the weight matrix such that the catalog(s) of resources, associated with the group profile identifier, correspond to a greater weight(s) than catalogs of resources, associated with the individual user identifiers, in the weight matrix.

The ASR component 850 receives (step 106) the weight matrix from the weighting component 140.

Figure 4:
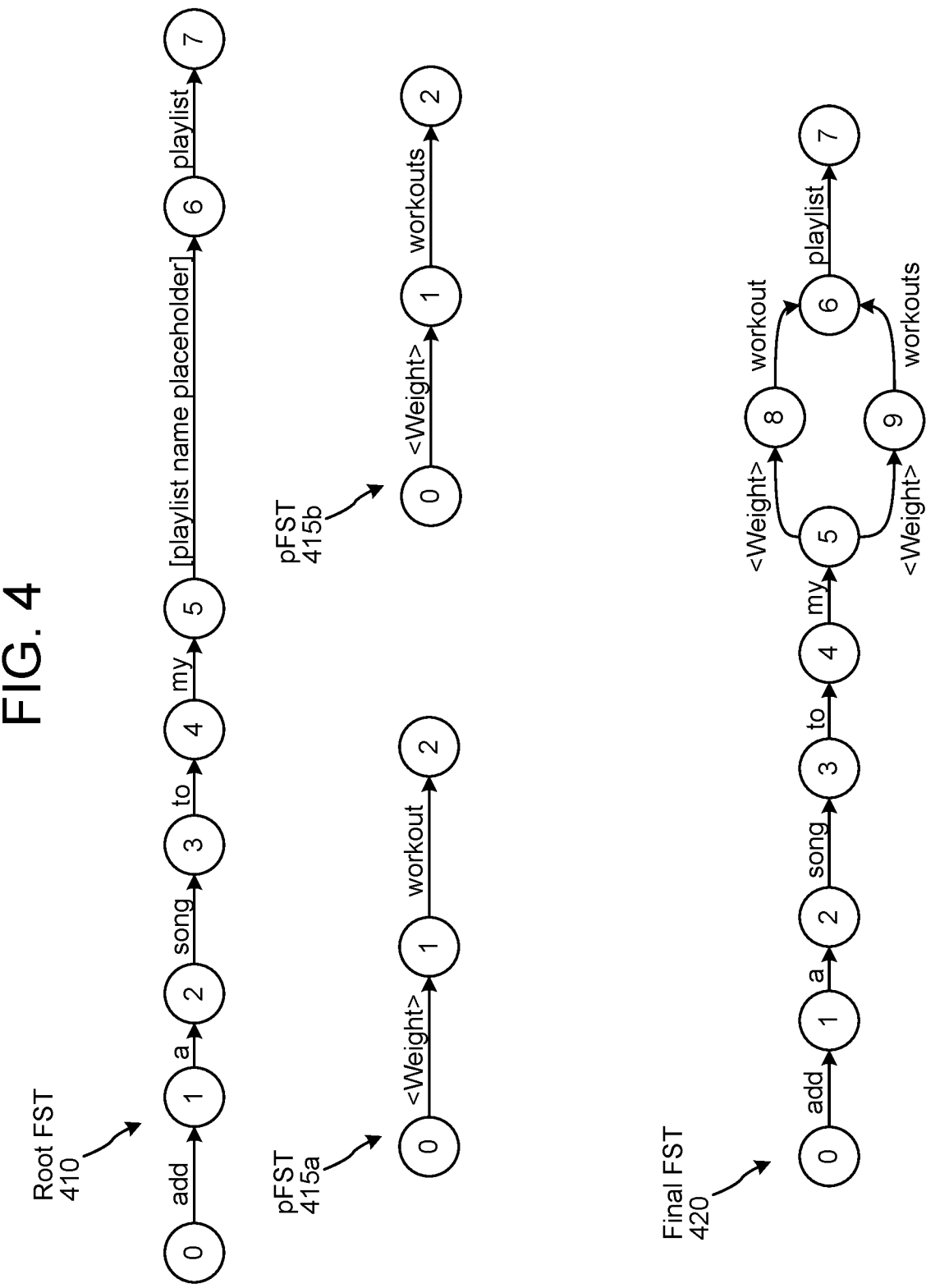
FIG. 4 is a conceptual diagram illustrating a root finite state transducer (FST), personalized FSTs (pFST), and a final FST that may be used to perform ASR processing, according to embodiments of the present disclosure.

Prior to, while, or after the weighting component 140 generates the weight matrix, the ASR component 850 may identify (step 306) a (stored, pre-established) root finite state transducer (FST) corresponding to a grammar model. An example of a root FST 410 for the grammar "add a song to my _____ playlist" is illustrated in FIG. 4. As illustrated, each word in the grammar may be represented by an arc connecting two nodes in the root FST, with an arc between nodes 5 and 6 being a placeholder for a playlist name.

The ASR component 850 may also generate (step 308) personalized FSTs (pFSTs) based on the resource lists and the weight matrix. As used herein, a "pFST" is a FST personalized based on one or more catalogs of resources of one or more users. Example pFSTs 415a/415b are illustrated in FIG. 4. As illustrated, a first pFST 415a may be generated based on a resource list including a "workout" playlist name, and a weight corresponding to the workout playlist name in the weight matrix. Moreover, a second pFST 415b may be generated based on a resource list including a "workouts" playlist name, and a weight corresponding to the workouts playlist name in the weight matrix.

The ASR component 850 may generate (step 310) a final FST based on the root FST and the pFSTs. The ASR component 850 generates the final FST 420 by updating the root FST 410 with the nodes and arcs from the pFSTs 415a/415b. In the example of FIG. 4, the ASR component 850 updates the root FST 410 to include new arcs where the placeholder arc was located in the root FST 410. That is, the root FST 410 is updated to replace the placeholder arc with new nodes 8 and 9, where the arc 5-8-6 represents the pFST 415a, and the arc 5-9-6 represents the pFST 415b.

Referring again to FIG. 3, the ASR component 850 generates (step 312) ASR output data based on the input audio data and the final FST. In particular, the ASR component 850 may process the input audio data to determine words therein corresponding to arcs of the final FST. Using the final FST 420 as an example, the ASR component 850 may determine the ASR output data "add a song to my workout playlist" and "add a song to my workouts playlist." The ASR component 850 may determine, for each ASR hypothesis in the ASR output data, an ASR confidence score representing a likelihood that the ASR hypothesis represents the spoken user input.

In determining an ASR confidence score, the ASR component 850 may consider the weight(s) in a traversed path of the final FST 420 that corresponds to the ASR hypothesis. For example, the ASR component 850 may consider the weight from nodes 5 to 8 when determining an ASR confidence score for the ASR hypothesis "add a song to my workout playlist." For further example, the ASR component 850 may consider the weight from nodes 5 to 9 when determining an ASR confidence score for the ASR hypothesis "add a song to my workouts playlist." By taking the weight(s) into consideration when determining an ASR confidence score, the ASR component 850 is able to prioritize resources based on the weight(s) in the weight matrix. Such may enable the ASR component 850 to differentiate between which path to traverse in a final FST including similar arcs (e.g., "workout" v. "workouts").

The ASR component 850 may output (to the orchestrator component 130 as "first data" mentioned with respect to FIG. 1) ASR output data corresponding to the ASR hypothesis having the greatest ASR confidence score, or a list of ASR hypotheses each associated with its respective ASR confidence score.

Figure 5:
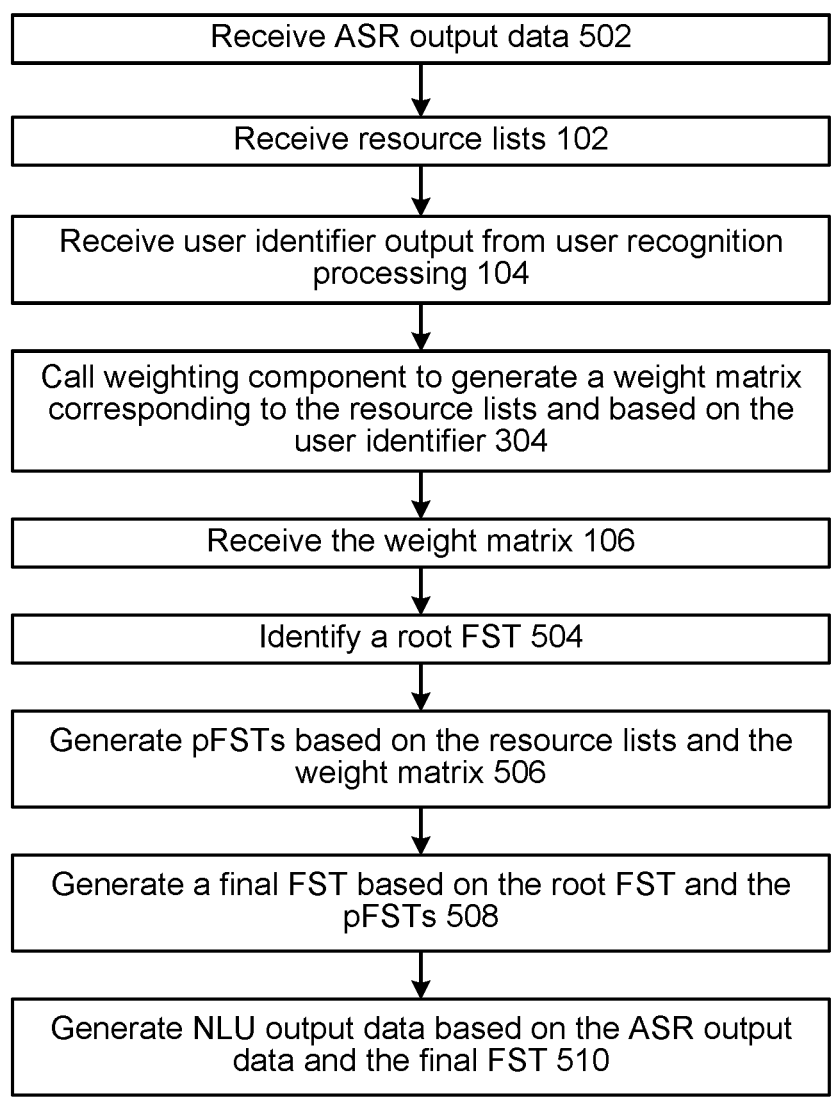
FIG. 5 is a process flow diagram illustrating processing that may be performed by a natural language understanding (NLU) component, according to embodiments of the present disclosure.

FIG. 5 illustrates example processing that may be performed by a NLU component 860 (an example processing component 135) of the system 120. As illustrated, the NLU component 860 may receive (step 502) ASR output data generated by the ASR component 850. The NLU component 860 may also receive (step 102) the resource lists (from the orchestrator component 130 or directly from the user profile storage 170), and receive (step 104) the user identifier output from user recognition processing, as described herein with respect to FIG. 1.

After receiving the resource lists and the user identifier, the NLU component 860 may call (step 304) the weighting component 140 to generate a weight matrix corresponding to the resource lists and based on the user identifier. As described with respect to FIG. 1, such a call may include the NLU component 860 sending, to the weighting component 140, the group profile identifier and user profile identifiers of the resource lists received by the NLU component 860, and the user identifier output by the user recognition component 195, and potential other context data such as, but not limited to, a device identifier of the device 110.

The weighting component 140 may then process, as described above with respect to FIGS. 1 and 3, to generate the weight matrix. Thereafter, the NLU component 860 receives (step 106) the weight matrix from the weighting component 140.

Figure 6:
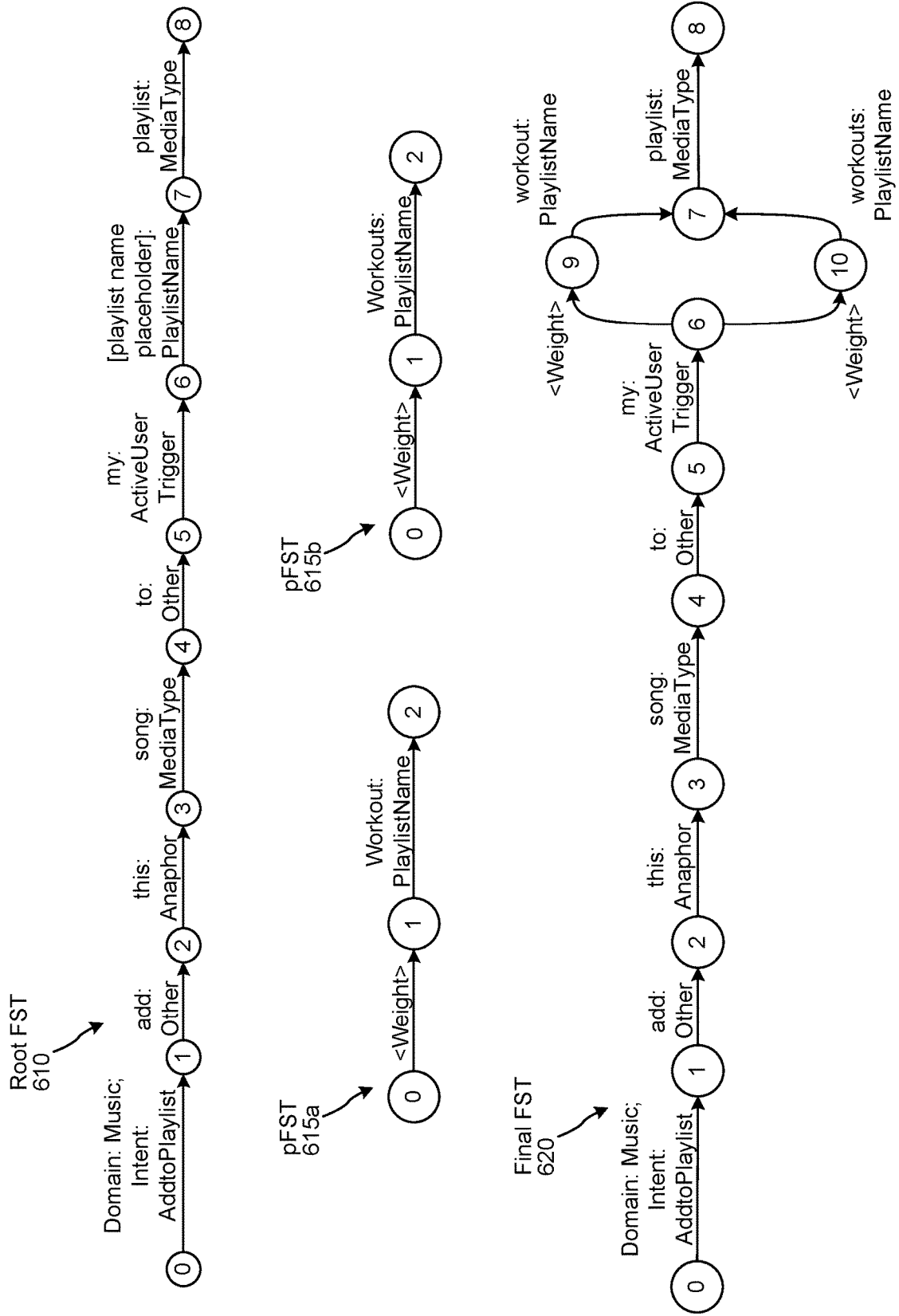
FIG. 6 is a conceptual diagram illustrating a root FST, pFSTs, and a final FST that may be used to perform NLU processing, according to embodiments of the present disclosure.

Prior to, while, or after the weighting component 140 generates the weight matrix, the NLU component 860 may identify (step 504) a (stored, pre-established) root FST for determining an intent of the user input, and entity types and corresponding entity names mentioned in the user input. An example of a root FST 610 for the "AddtoPlaylist" intent is illustrated in FIG. 6. As illustrated, an arc in the root FST may correspond to a type of one or more words in a user input.

The NLU component 860 may also generate (step 506) pFSTs based on the resource lists and the weight matrix. Example pFSTs 615a/615b are illustrated in FIG. 6. As illustrated, a first pFST 615a may be generated based on a resource list including a "workout" playlist name, and a weight corresponding to the workout playlist name in the weight matrix. Moreover, a second pFST 615b may be generated based on a resource list including a "workouts" playlist name, and a weight corresponding to the workouts playlist name in the weight matrix.

The NLU component 860 may generate (step 508) a final FST based on the root FST and the pFSTs. The NLU component 860 generates the final FST 620 by updating the root FST 610 with the nodes and arcs from the pFSTs 615a/615b. In the example of FIG. 6, the NLU component 860 updates the root FST 610 to include new nodes 9 and 10, where the arc 6-9-7 represents an entity type "PlaylistName" and an entity name "workout" of a first user's playlist catalog and a weight associated with that playlist catalog in the weight matrix, and the arc 6-10-7 represents an entity type "PlaylistName" and an entity name "workouts" of a second user's playlist catalog and a weight associated with that playlist catalog in the weight matrix.

Referring again to FIG. 5, the NLU component 860 generates (step 510) NLU output data based on the ASR output data and the final FST. The NLU output data includes an intent of the user input, and one or more entity types associated with respective entity names. In particular, the NLU component 860 may process the ASR output data to determine words therein corresponding to arcs of the final FST. Using the final FST 620 as an example, the NLU component 860 may determine the NLU output data to include the NLU hypotheses "Domain: Music; Intent: AddtoPlaylist; MediaType: song; PlaylistName: workout" and "Domain: Music; Intent: AddtoPlaylist; MediaType: song; PlaylistName: workouts." For each NLU hypothesis, the NLU component 860 may determine a NLU confidence score representing a likelihood that the NLU hypothesis represents the user input.

In determining an NLU confidence score, the NLU component 860 may consider the weight(s) in a traversed path of the final FST 620 that corresponds to the NLU hypothesis. For example, the NLU component 860 may consider the weight from nodes 6 to 9 when determining a NLU confidence score for the NLU hypothesis "Domain: Music; Intent: AddtoPlaylist; MediaType: song; PlaylistName: workout." For further example, the NLU component 860 may consider the weight from nodes 6 to 10 when determining a NLU confidence score for the NLU hypothesis "Domain: Music; Intent: AddtoPlaylist; MediaType: song; PlaylistName: workout." By taking the weight(s) into consideration when determining a NLU confidence score, the NLU component 860 is able to prioritize resources based on the weight(s) in the weight matrix. Such may enable the NLU component 860 to differentiate between which path to traverse in a final FST including similar arcs (e.g., "workout" v. "workouts").

The NLU component 860 may output (to the orchestrator component 130 as "first data" mentioned with respect to FIG. 1) NLU output data including the NLU hypothesis having the greatest NLU confidence score, or a list of NLU hypotheses each associated with its respective NLU confidence score.

The system 120 may also include an entity resolution component 865. The entity resolution component 865 is configured to resolve an indicated entity name in NLU output data to a particular entity identifier corresponding to an entity (e.g., a person, place, or thing) known to the system 120. The entity resolution component 865 may communicate with one or more knowledge bases stored by the system 120. In some embodiments, a knowledge base may include entity identifiers corresponding to a resource type (e.g., song titles, contact names, movie titles, etc.).

Figure 7:
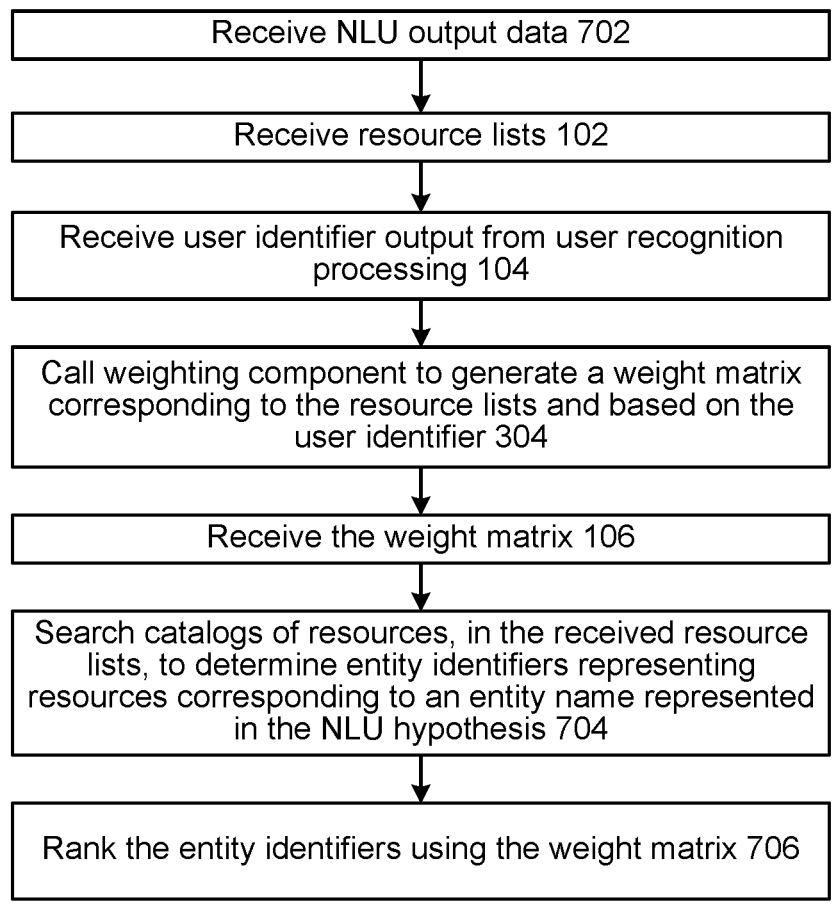
FIG. 7 is a process flow diagram illustrating processing that may be performed by an entity resolution component, according to embodiments of the present disclosure.

Referring to FIG. 7, the entity resolution component 865 may receive (step 702) NLU output data generated by the NLU component 860. The entity resolution component 865 may also receive (step 102) the resource lists (from the orchestrator component 130 or directly from the user profile storage 170), and receive (step 104) the user identifier output from user recognition processing, as described herein with respect to FIG. 1.

After receiving the resource lists and the user identifier, the entity resolution component 865 may call (step 304) the weighting component 140 to generate a weight matrix corresponding to the resource lists and based on the user identifier. As described with respect to FIG. 1, such a call may include the entity resolution component 865 sending, to the weighting component 140, the group profile identifier and user profile identifiers of the resource lists received by the entity resolution component 865, and the user identifier output by the user recognition component 195, and potential other context data such as, but not limited to, a device identifier of the device 110.

The weighting component 140 may then process, as described above with respect to FIGS. 1 and 3, to generate the weight matrix. Thereafter, the entity resolution component 865 receives (step 106) the weight matrix from the weighting component 140.

The entity resolution component 865 searches (704) the catalogs of resources, represented in the resource lists received at step 102, to determine entity identifiers representing resources corresponding to an entity name represented in the NLU output data received at step 702. In some embodiments, the entity resolution component 865 may determine an entity type corresponding to an entity name in the NLU output data, determine catalogs corresponding to the entity type (e.g., contact name, playlist name, etc.), and search the determined catalogs to identify entity identifiers of resources corresponding to the entity name. In some embodiments, such searching may take the form of an elastic search.

Using the weight matrix, the entity resolution component 865 determines (706) a ranked list of entity identifiers. For example, if the entity resolution component 865 determines a first user's contact list (in the first user's resource list) includes a first entity identifier corresponding to a first contact (e.g., a resource) corresponding to the entity name, and determines a second user's contact list (in the second user's resource list) includes a second entity identifier corresponding to a second contact (e.g., a resource) corresponding to the entity name, the entity resolution component 865 may determine ranked list of entity identifiers that ranks the first and second entity identifiers based on the weights of the first and second users' contact list catalog weights in the weight matrix.

The entity resolution component 865 may output (to the orchestrator component 130 as "first data" mentioned with respect to FIG. 1) the top-ranked entity identifier, or a list of entity identifiers each associated with its respective score.

Figure 8:
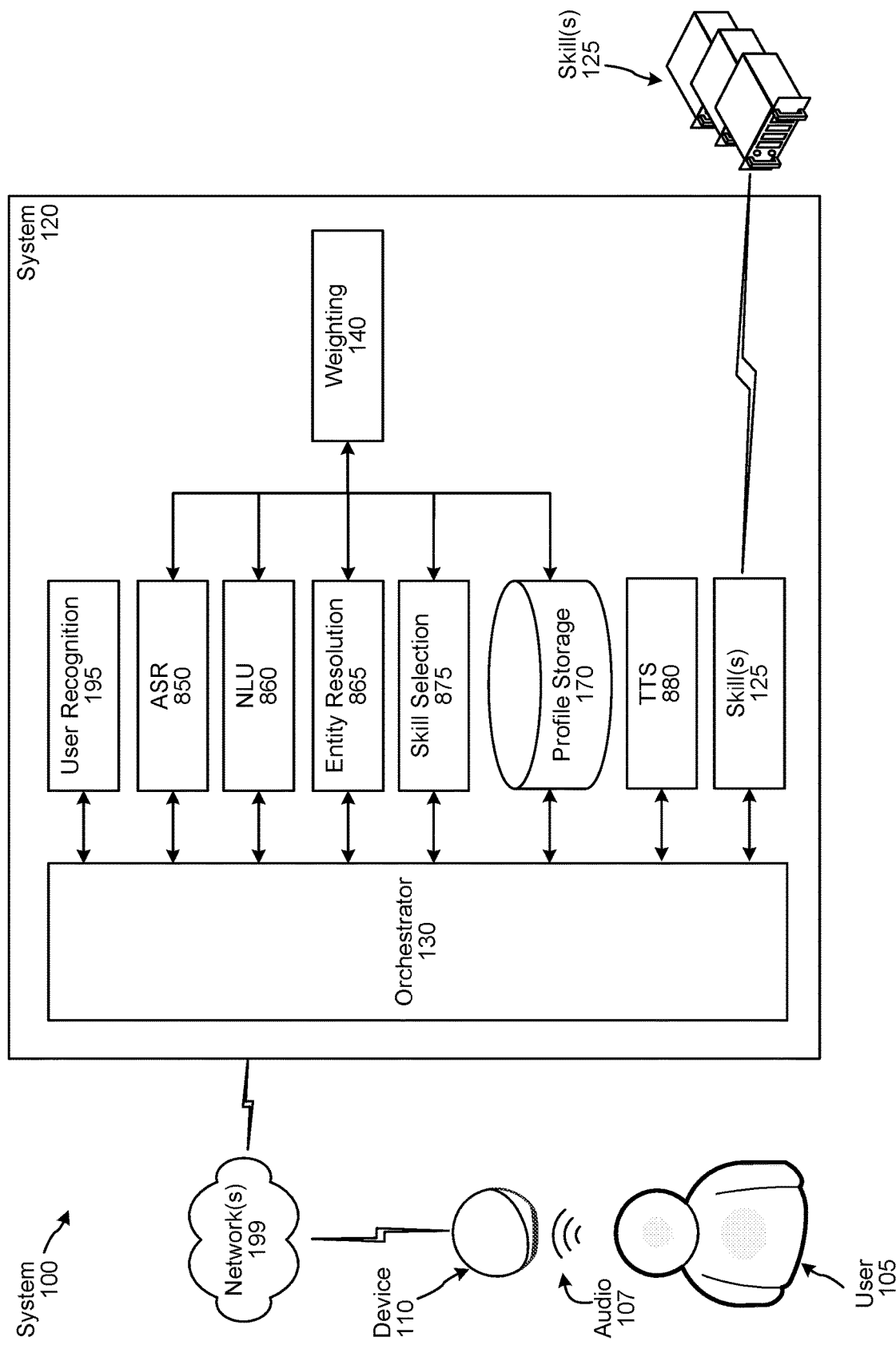
FIG. 8 is a conceptual diagram of components of a system, according to embodiments of the present disclosure.

The system 120 may use various components illustrated in FIG. 8 to respond to a user input. The various components may be located on a same or different physical devices. Communication between various components may occur directly or across a network(s) 199.

A microphone or array of microphones (of or otherwise associated with a device 110) may capture audio 107. The device 110 processes audio data 911 (illustrated in FIG. 9), representing the audio 107, to determine whether speech is detected. The device 110 may use various techniques to determine whether the audio data 911 includes speech. In some examples, the device 110 may apply voice activity detection (VAD) techniques. Such techniques may determine whether speech is present in the audio data 911 based on various quantitative aspects of the audio data 911, such as the spectral slope between one or more frames of the audio data 911, the energy levels of the audio data 911 in one or more spectral bands, the signal-to-noise ratios of the audio data 911 in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data 911 to one or more acoustic models in storage, whether the acoustic models may include models corresponding to speech, noise (e.g., environmental noise or background noise), or silence. Still other techniques may be used to determine whether speech is present in the audio data 911.

Once speech is detected in the audio data 911 representing the audio 107, the device 110 may determine if the speech is directed at the device 110/system 120. In at least some embodiments, such determination may be made using a wakeword detection component 920 (shown in FIG. 9). The wakeword detection component 920 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data 911, representing the audio 107, is analyzed to determine if specific characteristics of the audio data 911 match preconfigured acoustic waveforms, audio signatures, or other data corresponding to a wakeword.

Thus, the wakeword detection component 920 may compare the audio data 911 to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMIs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 920 may be built on deep neural network (DNN)/recursive neural network (RNN) structures directly, without HMM being involved. Such an architecture may estimate the posteriors of wakewords with context data, either by stacking frames within a context window for DNN, or using RNN. Following on posterior threshold tuning or smoothing is applied for decision making. Other techniques for wakeword detection, such as those known in the art, may also be used.

Once the wakeword detection component 920 detects a wakeword, the device 110 may "wake" and begin transmitting the audio data 911, representing the audio 107, to the system 120 (e.g., step 1 in FIG. 1). The audio data 911 may include data corresponding to the detected wakeword, or the device 110 may remove the portion of the audio 107, corresponding to the detected wakeword, prior to sending the audio data 911 to the system 120.

The orchestrator component 130 may receive the audio data 911 from the device 110, and send the audio data 911 to the ASR component 850.

The ASR component 850 transcribes the audio data 911 into one or more ASR hypotheses. An ASR hypothesis may be configured as a textual interpretation of the speech, or may be configured in another manner, such as one or more tokens. Each ASR hypothesis may represent a different likely interpretation of the speech in the audio data 911. Each ASR hypothesis may be associated with a score representing a confidence of ASR processing performed to determine the ASR hypothesis with which the score is associated.

The ASR component 850 may interpret the speech in the audio data 911 based on a similarity between the audio data 911 and language models (e.g., pFSTs described herein above with respect to FIGS. 3-4). For example, the ASR component 850 may compare the audio data 911 with models (e.g., pFSTs) for sounds (e.g., subword units, such as phonemes, etc.) and sequences of sounds to identify words that match the sequence of sounds of the speech represented in the audio data 911.

The NLU component 860 processes the ASR output data including one or more ASR hypotheses, output by the ASR component 850, to determine NLU output data including one or more NLU hypotheses. The NLU component 860 may perform intent classification (IC) processing on an ASR hypothesis to determine an intent of the user input. An intent corresponds to an action to be performed that is responsive to the user input. To perform IC processing, the NLU component 860 may communicate with a database of words linked to intents. For example, a music intent database may link words and phrases such as "quiet," "volume off," and "mute" to a <Mute> intent. The NLU component 860 identifies intents by comparing words and phrases in the ASR hypothesis to the words and phrases in an intents database. In some embodiments, the NLU component 860 may communicate with multiple intents databases, with each intents database corresponding to one or more intents associated with a particular domain or skill 125.

For example, IC processing of the user input "play my workout playlist" may determine an intent of <PlayMusic>. For further example, IC processing of the user input "call mom" may determine an intent of <Call>. In another example, IC processing of the user input "call mom using video" may determine an intent of <VideoCall>. In yet another example, IC processing of the user input "what is today's weather" may determine an intent of <OutputWeather>.

The NLU component 860 may also perform named entity recognition (NER) processing on the ASR hypothesis to determine one or more entity names that are mentioned in the user input and that may be needed for post-NLU processing. For example, NER processing of the user input "play [song name]" may determine an entity type of "SongName" and an entity name of "[song name]." For further example, NER processing of the user input "call mom" may determine an entity type of "Recipient" and an entity name of "mom." In another example, NER processing of the user input "what is today's weather" may determine an entity type of "Date" and an entity name of "today."

In at least some embodiments, the intents identifiable by the NLU component 860 may be linked to one or more grammar FSTs with entity types to be populated with entity names. Each entity type of a FST may correspond to a portion of an ASR hypothesis that the NLU component 860 believes corresponds to an entity name. For example, an FST corresponding to a <PlayMusic> intent may correspond to sentence structures such as "Play {Artist Name}," "Play {Album Name}," "Play {Song name}," "Play {Song name} by {Artist Name}," etc.

For example, the NLU component 860 may perform NER processing to identify words in an ASR hypothesis as subject, object, verb, preposition, etc. based on grammar rules and/or models. Then, the NLU component 860 may perform IC processing using the identified verb to identify an intent. Thereafter, the NLU component 860 may again perform NER processing to determine a FST associated with the identified intent. For example, a FST for a <PlayMusic> intent may specify a list of entity types applicable to play the identified "object" and any object modifier (e.g., a prepositional phrase), such as {Artist Name}, {Album Name}, {Song name}, etc.

The NLU component 860 may generate one or more NLU hypotheses, where each NLU hypothesis includes an intent and optionally one or more entity types and corresponding entity names. In some embodiments, a NLU hypothesis may be associated with a score representing a confidence of NLU processing performed to determine the NLU hypothesis with which the score is associated.

As described above, the system 120 may perform speech processing using two different components (e.g., the ASR component 850 and the NLU component 860). In at least some embodiments, the system 120 may implement a spoken language understanding (SLU) component configured to process audio data to determine one or more NLU hypotheses.

The SLU component may be equivalent to a combination of the ASR component 850 and the NLU component 860. Yet, the SLU component may process audio data and directly determine the one or more NLU hypotheses, without an intermediate step of generating one or more ASR hypotheses. As such, the SLU component may take audio data representing speech and attempt to make a semantic interpretation of the speech. That is, the SLU component may determine a meaning associated with the speech and then implement that meaning. For example, the SLU component may interpret audio data representing speech from the user 105 in order to derive a desired action. The SLU component may output a most likely NLU hypothesis, or multiple NLU hypotheses associated with respective confidence or other scores (such as probability scores, etc.).

The entity resolution component 865 may process the NLU hypothesis(es) output by the NLU component 860, to determine entity values for entity names represented in the NLU hypothesis(es). Such is described herein above with respect to FIG. 7.

The system 120 may include a skill selection component 875 configured to determine a skill 125, to execute to respond to the user input, based on the NLU hypothesis(es), determined by the NLU component 860, and the entity identifier(s) determined by the entity resolution component 865. The skill selection component 875 may include a skill proposal component, a skill pre-response component, and a skill ranking component.

The skill proposal component is configured to determine skills 125 capable of processing in response to the user input. In addition to receiving the NLU hypotheses, the skill proposal component may also receive context data corresponding to the user input. For example, the context data may indicate a skill that was causing the device 110 to output content (e.g., music, video, synthesized speech, etc.) when the device 110 captured the user input, one or more skills that are indicated as enabled in a profile (as stored in the profile storage 170) associated with the user 105, output capabilities (which may be represented as a device type identifier) of the device 110, a geographic location of the device 110, and/or other context data available to the system 120 and corresponding to the user input.

The skill proposal component may determine skill proposal rules. A skill developer (via a skill developer device) may provide one or more rules representing when the skill developer's skill should be invoked to respond to a user input. In at least some embodiments, such a rule may be specific to an intent. In such embodiments, if a skill 125 is configured to execute with respect to multiple intents, the skill 125 may be associated with more than one rule (e.g., each rule corresponding to a different intent capable of being handled by the 125). In addition to being specific to an intent, a rule may indicate one or more entity identifiers with respect to which the skill should be invoked. For further example, a rule may indicate output capabilities of a device, a geographic location, and/or other conditions.

The system 120 may associate each skill 125 with each rule corresponding to the skill 125. As an example, the system 120 may store a rule indicating a video skill may execute when a user input corresponds to a "Play Video" intent and the device includes or is otherwise associated with a display. As another example, the system 120 may store a rule indicating a music skill may execute when a user input corresponds to a "PlayMusic" intent and music is being output by a device when the device captures the user input. It will be appreciated that other examples are possible. The foregoing rules enable skills to be differentially proposed at runtime, based on various conditions, in systems where multiple skills are configured to execute with respect to the same intent.

The skill proposal component, using the NLU hypothesis(es), received context data, and the foregoing described skill proposal rules, determines skills 125 configured to process in response to the user input. Thus, in at least some embodiments, the skill proposal component may be implemented as a rules engine. In at least some embodiments, the skill proposal component may make binary (e.g., yes/no, true/false, etc.) determinations regarding whether a skill 125 is configured to process in response to the user input. For example, the skill proposal component may determine a skill 125 is configured to process, in response to the user input, if the skill 125 is associated with a rule corresponding to the intent (represented in a NLU hypothesis), the context data, and optionally one or more entity identifiers determined by the entity recognition component 865 for the NLU hypothesis.

In at least some embodiments, the skill proposal component may make such binary determinations with respect to all skills 125 implemented by or otherwise in communication with the system 120. In at least some embodiments, the skill proposal component may make the binary determinations with respect to only a portion of the skills 125 implemented by or otherwise in communication with the system 120 (e.g., only skills 125 indicated as enabled in the user profile of the user 105).

After the skill proposal component is finished processing, the skill pre-response component is called to execute. The skill pre-response component is configured to query skills, determined by the skill proposal component as configured to process the user input, as to whether the skills are in fact able to respond to the user input. The skill pre-response component may take as input one or more of the NLU hypotheses (input to the skill selection component 875), where each of the one or more NLU hypotheses is associated with a particular skill determined by the skill proposal component as being configured to respond to the user input.

The skill pre-response component sends a pre-response query to each skill 125 determined by the skill proposal component. A pre-response query may include the NLU hypothesis (associated with the skill 125) and optionally other context data corresponding to the user input (e.g., device type of the device 110).

A skill 125 may determine, based on a received pre-response query (and optionally other data available to the skill 125), whether the skill 125 is capable of respond to the user input. For example, a skill 125 may generate a pre-response indicating the skill 125 can respond to the user input, indicating the skill 125 may be able to respond to the user input (e.g., the indicating the skill 125 needs more data to determine whether the skill 125 can respond to the user input), or indicating the skill 125 cannot respond to the user input (e.g., due to a present processing load of the skill 125).

In situations where a skill's pre-response indicates the skill 125 can or may be able to respond to the user input, the skill's pre-response may also include various other data representing a strength of the skill's potential response to the user input. Such other data may positively influence the skill's ranking by the skill ranking component of the skill selection component 875. For example, such other data may indicate capabilities (e.g., output capabilities or components such as a connected screen, loudspeaker, etc.) of a device to be used to output the skill's response; pricing data corresponding to a product or service the user input is requesting be purchased (or is requesting information for); availability of a product the user input is requesting be purchased; whether there are shipping fees for a product the user input is requesting be purchased; whether the user 105 already has a profile and/or subscription with the skill 125; that the user 105 does not have a subscription with the skill 125, but that there is a free trial/tier the skill 125 is offering; with respect to a taxi skill, a cost of a trip based on start and end locations, how long the user 105 would have to wait to be picked up, etc.; and/or other data available to the skill 125 that is related to the skill's processing of the user input. In at least some embodiments, a skill's pre-response may include an indicator (e.g., a flag) representing a strength of the skill's ability to personalize its response to the user input.

In at least some embodiments, a skill's pre-response may be configured to a schema pre-defined by the system 120. By the system 120 requiring pre-responses to conform to a specific schema (e.g., by requiring skills 125 to only be able to provide certain types of data in pre-responses), the system 120 may onboard new skills 125 into the skill selection functionality described herein without needing to reconfigure the skill selection component 875 each time a new skill 125 is onboarded. Moreover, requiring pre-responses to conform to a schema limits the amount of values needed to be used to train and implement a machine learning model for ranking skills 125.

After the skill pre-response component queries the skills 125 for pre-responses, the skill ranking component may be called to execute. The skill ranking component may be configured to select a single skill 125, from among the skills determined by the skill proposal component, to respond to the user input. In some embodiments, the skill ranking component may implemented a ML model. In at least some embodiments, the ML model may be a deep neural network (DNN).

The skill ranking component may take as input the NLU hypotheses determined by the NLU component 860 and input to the skill selection component 875, the skill pre-responses received by the skill pre-response component, one or more preferences (e.g., skill preferences) of the user 105 (as represented in a user profile or group profile stored in the profile storage 170), NLU confidence scores of the NLU hypotheses (as determined by the NLU component 860), a device type of the device 110, data indicating whether the device 110 was outputting content when the user input was received, and/or other context data available to the skill ranking component.

The skill ranking component ranks the skills 125 using the ML model. Things that may increase a skill's ranking include, for example, that the skill 125 is associated with a pre-response indicating the skill 125 can generate a response (to the user input) that is personalized to the user 105, that a NLU hypothesis corresponding to the skill 125 is associated with a NLU confidence score satisfying (e.g., meeting or exceeding) a condition (e.g., a threshold NLU confidence score), that the skill 125 was outputting content via the device 110 when the device 110 received the user input, etc. Things that may decrease a skill's ranking include, for example, that the skill 125 is associated with a pre-response indicating the skill 125 cannot generate a response (to the user input) that is personalized to the user 105, that a NLU hypothesis corresponding to the skill 125 is associated with a NLU confidence score failing to satisfy (e.g., failing to meet or exceed) a condition (e.g., a threshold NLU confidence score), etc.

The skill ranking component may generate a score for each skill determined by the skill proposal component, where the score represents a strength with which the skill ranking component recommends the associated skill 125 is to execute to respond to the user input. Such a confidence score may be a numeric score (e.g., between 0 and 1) or a binned score (e.g., low, medium, high). The skill ranking component may output a single skill selection hypothesis, indicating the top ranked skill and its corresponding NLU hypothesis, to the orchestrator component 130.

In some embodiments, the skill selection component 875 may receive resource lists and determine a skill using a weight matrix received from the weighting component 140.

In response the orchestrator component 130 may call (step 9 in FIG. 1) the skill 125 represented in the skill selection hypothesis. Such a call may include the orchestrator component 130 sending, to the skill 125, the NLU hypothesis represented in the skill selection hypothesis. The skill 125 may then execute to perform an action responsive to the user input, as represented by the NLU hypothesis.

The system 120 may include a TTS component 880 that generates audio data including synthesized speech. The data input to the TTS component 880 may come from a skill 125, the orchestrator component 130, or another component of the system 120.

In one method of synthesis called unit selection, the TTS component 880 matches input data against a database of recorded speech. The TTS component 880 selects matching units of recorded speech and concatenates the units together to form audio data. In another method of synthesis called parametric synthesis, the TTS component 880 varies parameters such as frequency, volume, and noise to determine audio data including an artificial speech waveform. Parametric synthesis uses a computerized voice generator, sometimes called a vocoder.

Figure 9:
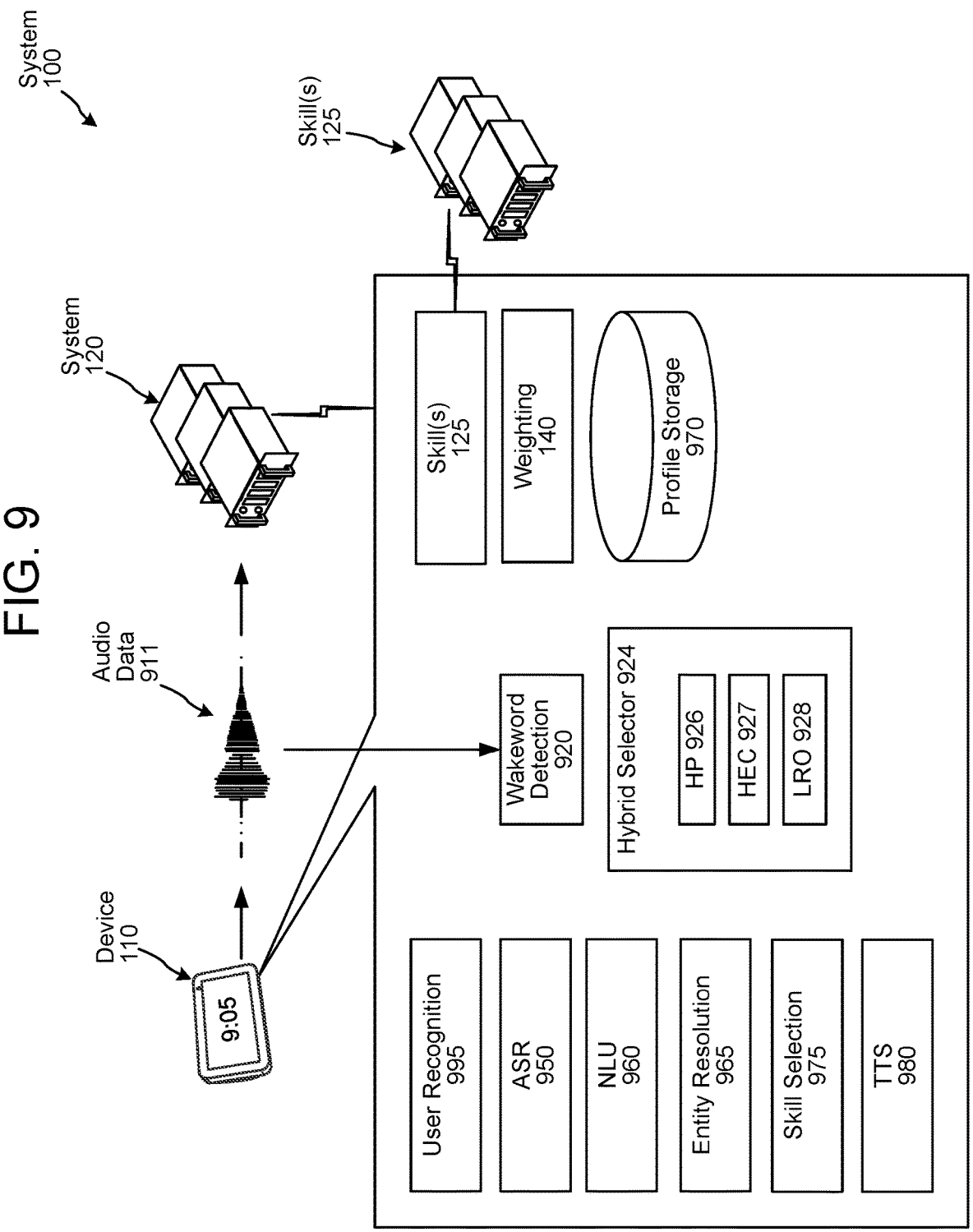
FIG. 9 is a conceptual diagram of components of a device, according to embodiments of the present disclosure.

The foregoing describes illustrative components and processing of the system 120. The following describes illustrative components and processing of the device 110. As illustrated in FIG. 9, in at least some embodiments the system 120 may receive the audio data 911 from the device 110, to recognize speech in the received audio data 911, and to perform functions in response to the recognized speech. In at least some embodiments, these functions involve sending directives (e.g., commands), from the system 120 to the device 110 to cause the device 110 to perform an action, such as output synthesized speech (responsive to the user input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, output content (e.g., music) via the loudspeaker(s) of (or otherwise associated with) the device 110, display content on a display of (or otherwise associated with) the device 110, and/or send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

As noted with respect to FIG. 8, the device 110 may include a wakeword detection component 920 configured to used to detect a wakeword (e.g., "Alexa") that indicates to the device 110 that the audio data 911 is to be processed for determining one or more ASR hypotheses. In at least some embodiments, a hybrid selector 924, of the device 110, may send the audio data 911 to the wakeword detection component 920. If the wakeword detection component 920 detects a wakeword in the audio data 911, the wakeword detection component 920 may send an indication of such detection to the hybrid selector 924. In response to receiving the indication, the hybrid selector 924 may send the audio data 911 to the system 120 and/or an ASR component 950 implemented by the device 110. The wakeword detection component 920 may also send an indication, to the hybrid selector 924, representing a wakeword was not detected. In response to receiving such an indication, the hybrid selector 924 may refrain from sending the audio data 911 to the system 120, and may prevent the ASR component 950 from processing the audio data 911. In this situation, the audio data 911 can be discarded.

The device 110 may conduct its own speech processing using on-device language processing components (such as an on-device SLU component, an ASR component 950, and/or a NLU component 960) similar to the manner discussed above with respect to the system-implemented SLU component, ASR component 850, and NLU component 860. The device 110 may also internally include, or otherwise have access to, other components such as one or more skills 125, a user recognition component 995 (configured to process in a similar manner to the user recognition component 195 implemented by the system 120), a profile storage 970 (configured to store similar profile data to the profile storage 170 implemented by the system 120), a TTS component 980 (configured to process in a similar manner to the TTS component 880 implemented by the system 120), a skill selection component 975 (configured to process in a similar manner to the skill selection component 875 implemented by the system 120), an entity resolution component 965 (configured to process in a similar manner to the entity resolution component 865 implemented by the system 120), the weighting component 140, and/or other components. In at least some embodiments, the profile storage 970 may only store user profile data and group profile data for users specifically associated with the device 110.

In at least some embodiments, the on-device language processing components may not have the same capabilities as the language processing components implemented by the system 120. For example, the on-device language processing components may be configured to handle only a subset of the user inputs that may be handled by the system-implemented language processing components. For example, such subset of user inputs may correspond to local-type user inputs, such as those controlling devices or components associated with a user's home. In such circumstances the on-device language processing components may be able to more quickly interpret and respond to a local-type user input, for example, than processing that involves the system 120. If the device 110 attempts to process a user input for which the on-device language processing components are not necessarily best suited, the one or more NLU hypotheses, determined by the on-device components, may have a low confidence or other metric indicating that the processing by the on-device language processing components may not be as accurate as the processing done by the system 120.

The hybrid selector 924, of the device 110, may include a hybrid proxy (HP) 926 configured to proxy traffic to/from the system 120. For example, the HP 926 may be configured to send messages to/from a hybrid execution controller (HEC) 927 of the hybrid selector 924. For example, command/directive data received from the system 120 can be sent to the HEC 927 using the HP 926. The HP 926 may also be configured to allow the audio data 911 to pass to the system 120 while also receiving (e.g., intercepting) this audio data 911 and sending the audio data 911 to the HEC 927.

In at least some embodiments, the hybrid selector 924 may further include a local request orchestrator (LRO) 928 configured to notify the ASR component 950 about the availability of the audio data 911, and to otherwise initiate the operations of on-device language processing when the audio data 911 becomes available. In general, the hybrid selector 924 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 911 is received, the HP 926 may allow the audio data 911 to pass through to the system 120 and the HP 926 may also input the audio data 911 to the ASR component 950 by routing the audio data 911 through the HEC 927 of the hybrid selector 924, whereby the LRO 928 notifies the ASR component 950 of the audio data 911. At this point, the hybrid selector 924 may wait for response data from either or both the system 120 and/or the on-device language processing components. However, the disclosure is not limited thereto, and in some examples the hybrid selector 924 may send the audio data 911 only to the ASR component 950 without departing from the disclosure. For example, the device 110 may process the audio data 911 on-device without sending the audio data 911 to the system 120.

The ASR component 950 is configured to receive the audio data 911 from the hybrid selector 924, and to recognize speech in the audio data 911, and the NLU component 960 is configured to determine an intent from the recognized speech (an optionally one or more named entities), and to determine how to act on the intent by generating directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the NLU component 960) may be selected as usable to respond to a user input, and local response data may be sent to the hybrid selector 924, such as a "ReadyToExecute" response. The hybrid selector 924 may then determine whether to use directive data from the on-device components to respond to the user input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each user input. The device 110 may include the unique identifier when sending the audio data 911 to the system 120, and the response data from the system 120 may include the unique identifier to identify to which user input the response data corresponds.

In at least some embodiments, the device 110 may include one or more skills 125 that may process similarly to the system-implemented skill(s) 125. The skill(s) 125 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 10:
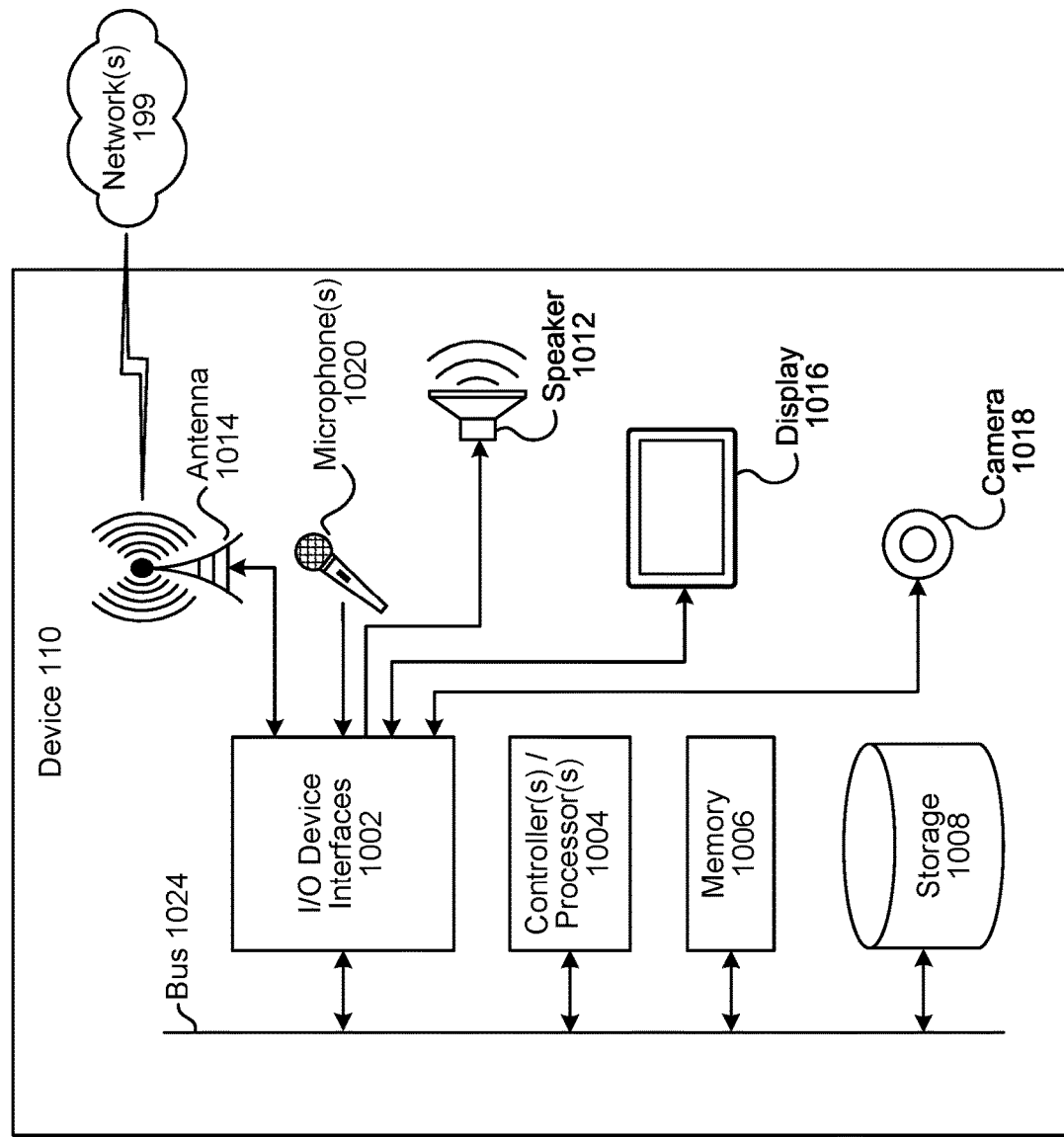
FIG. 10 is a block diagram conceptually illustrating example components of a device, according to embodiments of the present disclosure.
Figure 11:
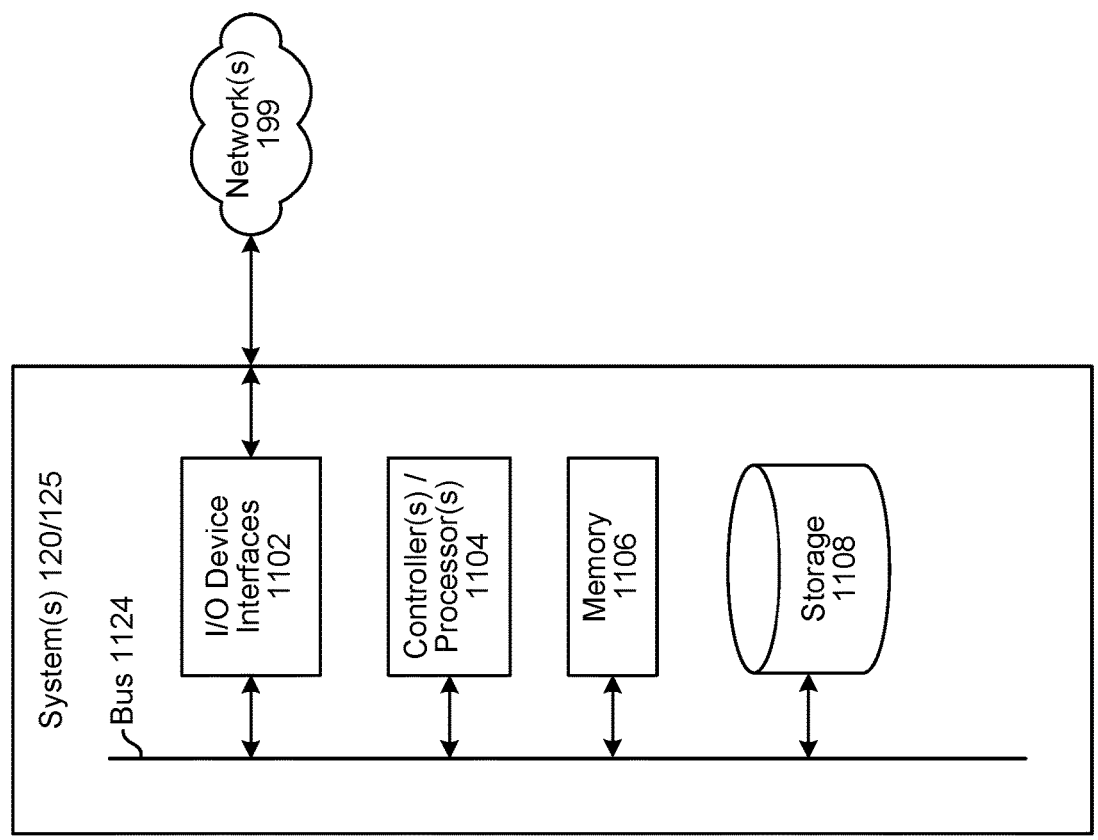
FIG. 11 is a block diagram conceptually illustrating example components of a system, according to embodiments of the present disclosure.

FIG. 10 is a block diagram conceptually illustrating a device 110 that may be used with the system 120. FIG. 11 is a block diagram conceptually illustrating example components of a remote device, such as the system 120, which may assist with ASR processing, NLU processing, etc.; and a skill 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill 125, etc. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device 110, the system 120, and/or a skill 125 may include their own dedicated processors, memory, and/or storage. Alternatively, one or more of the components of the device 110, the system 120, and/or a skill 125 may utilize the I/O interfaces (1002/1102), processor(s) (1004/1104), memory (1006/1106), and/or storage (1008/1108) of the device(s) 110, system 120, or the skill 125, respectively. Thus, the ASR component 850 may have its own I/O interface(s), processor(s), memory, and/or storage; the NLU component 860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill 125, as described herein, are illustrative, and may be located as a stand-alone device or may be included, in whole or in part, as a component of a larger device or system.

As illustrated in FIG. 12, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, the skill(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 850, the NLU component 860, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a device, first input audio data corresponding to a first spoken input;
   determining a first user profile associated with the device;
   determining first resources associated with the first user profile, the first resources capable of being used to respond to the first spoken input;
   determining a second user profile associated with the device;
   determining second resources associated with a second user profile, the second resources capable of being used to respond to the first spoken input;
   performing automatic speech recognition (ASR) processing on the first input audio data to generate ASR output data corresponding to the first spoken input, wherein performing the ASR processing comprises:
      receiving a first finite state transducer (FST) corresponding to a grammar model,
      determining a weight matrix corresponding to the first resources and the second resources, the weight matrix including a first weight corresponding to the first resources and a second weight corresponding to the second resources,
      generating a second FST corresponding to the grammar model, the second FST including:
         a first arc indicating a first resource of the first resources and the first weight, and
         a second arc indicating a second resource of the second resources and the second weight, and
      traversing, using the first input audio data, the second FST to determine the ASR output data;
   performing natural language understanding (NLU) processing using the ASR output data to generate NLU output data indicating an intent of the first spoken input;
   determining output data based on the NLU output data; and
   sending the output data to the device.

2. The computer-implemented method of claim 1, wherein performing the NLU processing comprises:
   determining a third FST corresponding to an intent and at least one entity type;
   generating a fourth FST comprising:
      the third FST,
      a third arc corresponding to the at least one entity type and configured using the first resources and the first weight, and
      a fourth arc corresponding to the at least one entity type and configured using the second resources and the second weight; and
   traversing, using the ASR output data, the fourth FST to generate the NLU output data.

3. The computer-implemented method of claim 1, wherein the NLU output data further indicates an entity name, and wherein the computer-implemented method further comprises:
   determining, in the first resources, a first entity identifier representing a first resource corresponding to the entity name;
   determining, in the second resources, a second entity identifier representing a second resource corresponding to the entity name;
   determining a ranked list of entity identifiers including the first entity identifier and the second entity identifier, the ranked list of entity identifiers being determined based on the first weight corresponding to the first resources in the weight matrix and the second weight corresponding to the second resources in the weight matrix; and
   determining the output data based on the ranked list of entity identifiers.

4. The computer-implemented method of claim 1, further comprising:
   receiving, from the device and prior to receiving the first input audio data, second input audio data corresponding to a second spoken input;
   determining the second spoken input requests a third user profile be associated with a group profile associated with the device;
   storing an association between the group profile and the third user profile, the association representing the third user profile as a guest user profile;
   determining, after receiving the first input audio data, third resources associated with the third user profile; and
   determining the weight matrix to further correspond to the third resources.

5. A computer-implemented method comprising:
   receiving, from a device, first input data corresponding to a first user input;
   determining a first user profile associated with the device;
   determining first resources associated with the first user profile;
   determining a second user profile associated with the device;
   determining second resources associated with the second user profile;
   determining weight data corresponding to the first resources and the second resources;
   determining first data based at least in part on the first resources, the second resources, and the weight data;
   determining output data using the first data, the output data being responsive to the first user input; and
   sending the output data to the device.

6. The computer-implemented method of claim 5, wherein the first input data is first input audio data corresponding to a first spoken input, and wherein the computer-implemented method further comprises:
   sending the first input audio data to an automatic speech recognition (ASR) component;
   sending the first resources to the ASR component;
   sending the second resources to the ASR component; and
   receiving, from the ASR component, the first data to include ASR output data generated using the first input audio data, the first resources, the second resources, and the weight data.

7. The computer-implemented method of claim 5, further comprising:
   receiving a first finite state transducer (FST) corresponding to a grammar model;

generating a second FST corresponding to the grammar model, the second FST including:
a first arc indicating a first resource of the first resources and a first weight corresponding to the first resources in the weight data, and
a second arc indicating a second resource of the second resources and a second weight corresponding to the second resources in the weight data; and
determining the first data based at least in part on the second FST.

8. The computer-implemented method of claim 5, further comprising:
sending the first resources to a natural language understanding (NLU) component;
sending the second resources to the NLU component; and
receiving, from the NLU component, the first data to include NLU output data indicating an intent of the first user input, the NLU component generating the NLU output data based at least in part on the first resources, the second resources, and the weight data.

9. The computer-implemented method of claim 5, further comprising:
determining natural language understanding (NLU) output data corresponding to the first user input, the NLU output data indicating an intent and an entity name;
sending the NLU output data to an entity resolution component;
sending the first resources to the entity resolution component;
sending the second resources to the entity resolution component; and
receiving, from the entity resolution component, the first data to include an entity identifier determined using the NLU output data, the first resources, the second resources, and the weight data.

10. The computer-implemented method of claim 5, further comprising:
determining the first user input corresponds to a domain;
determining a weight preference associated with the domain in the first user profile; and
determining the weight data based at least in part on the weight preference.

11. The computer-implemented method of claim 5, further comprising:
receiving, from the device and prior to receiving the first input data, second input data corresponding to a second user input;
determining the second user input requests a third user profile be associated with a group profile associated with the device;
storing an association between the group profile and the third user profile, the association representing the third user profile as a guest user profile;
determining, after receiving the first input data, third resources associated with the third user profile; and
determining the weight data to further correspond to the third resources.

12. The computer-implemented method of claim 5, further comprising:
determining group profile associated with the device;
determining third resources associated with the group profile; and
determining the weight data to further corresponding to the third resources.

13. A computing system comprising:
at least one processor; and
at least one memory comprising instructions that, when executed by the at least one processor, cause the computing system to:
receive, from a device, first input data corresponding to a first user input;
determine a first user profile associated with the device;
determine first resources associated with the first user profile;
determine a second user profile associated with the device;
determine second resources associated with the second user profile;
determine weight data corresponding to the first resources and the second resources;
determine first data based at least in part on the first resources, the second resources, and the weight data;
determine output data using the first data, the output data being responsive to the first user input; and
send the output data to the device.

14. The computing system of claim 13, wherein the first input data is first input audio data corresponding to a first spoken input, and wherein the at least one memory further comprises instructions that, when executed by the at least one processor, further cause the computing system to:
send the first input audio data to an automatic speech recognition (ASR) component;
send the first resources to the ASR component;
send the second resources to the ASR component; and
receive, from the ASR component, the first data to include ASR output data generated using the first input audio data, the first resources, the second resources, and the weight data.

15. The computing system of claim 13, wherein the at least one memory further comprises instructions that, when executed by the at least one processor, further cause the computing system to:
receive a first finite state transducer (FST) corresponding to a grammar model;
generate a second FST corresponding to the grammar model, the second FST including:
a first arc indicating a first resource of the first resources and a first weight corresponding to the first resources in the weight data, and
a second arc indicating a second resource of the second resources and a second weight corresponding to the second resources in the weight data; and
determine the first data based at least in part on the second FST.

16. The computing system of claim 13, wherein the at least one memory further comprises instructions that, when executed by the at least one processor, further cause the computing system to:
send the first resources to a natural language understanding (NLU) component;
send the second resources to the NLU component; and
receive, from the NLU component, the first data to include NLU output data indicating an intent of the first user input, the NLU component generating the NLU output data based at least in part on the first resources, the second resources, and the weight data.

17. The computing system of claim 13, wherein the at least one memory further comprises instructions that, when executed by the at least one processor, further cause the computing system to:

determine natural language understanding (NLU) output data corresponding to the first user input, the NLU output data indicating an intent and an entity name;
send the NLU output data to an entity resolution component;
send the first resources to the entity resolution component;
send the second resources to the entity resolution component; and
receive, from the entity resolution component, the first data to include an entity identifier determined using the NLU output data, the first resources, the second resources, and the weight data.

18. The computing system of claim 13, wherein the at least one memory further comprises instructions that, when executed by the at least one processor, further cause the computing system to:
determine the first user input corresponds to a domain;
determine a weight preference associated with the domain in the first user profile; and
determine the weight data based at least in part on the weight preference.

19. The computing system of claim 13, wherein the at least one memory further comprises instructions that, when executed by the at least one processor, further cause the computing system to:
receive, from the device and prior to receiving the first input data, second input data corresponding to a second user input;
determine the second user input requests a third user profile be associated with a group profile associated with the device;
store an association between the group profile and the third user profile, the association representing the third user profile as a guest user profile;
determine, after receiving the first input data, third resources associated with the third user profile; and
determine the weight data to further correspond to the third resources.

20. The computing system of claim 13, wherein the at least one memory further comprises instructions that, when executed by the at least one processor, further cause the computing system to:
determine group profile associated with the device;
determine third resources associated with the group profile; and
determine the weight data to further corresponding to the third resources.

* * * * *